United States Patent
Kim et al.

(10) Patent No.: US 10,306,163 B2
(45) Date of Patent: May 28, 2019

(54) ELECTRONIC DEVICE HAVING CAMERA MODULE, AND IMAGE PROCESSING METHOD FOR ELECTRONIC DEVICE

(71) Applicant: Samsung Electronics Co., Ltd., Suwon-si, Gyeonggi-do (KR)

(72) Inventors: Moonsoo Kim, Seoul (KR); Haesun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/554,925

(22) PCT Filed: Mar. 9, 2016

(86) PCT No.: PCT/KR2016/002364
§ 371 (c)(1),
(2) Date: Aug. 31, 2017

(87) PCT Pub. No.: WO2016/144102
PCT Pub. Date: Sep. 15, 2016

(65) Prior Publication Data
US 2018/0041724 A1    Feb. 8, 2018

(30) Foreign Application Priority Data

Mar. 9, 2015  (KR) .................. 10-2015-0032377

(51) Int. Cl.
*H04N 5/355*  (2011.01)
*H04N 5/235*  (2006.01)
*H04N 5/353*  (2011.01)

(52) U.S. Cl.
CPC ......... *H04N 5/35563* (2013.01); *H04N 5/235* (2013.01); *H04N 5/2355* (2013.01);
(Continued)

(58) Field of Classification Search
CPC .......... H04N 5/35563; H04N 5/35554; H04N 5/2355; H04N 5/235; H04N 5/355; H04N 5/353; H04N 5/3532
See application file for complete search history.

(56) References Cited

U.S. PATENT DOCUMENTS 8,027,538 B1    9/2011  Peterson
2010/0150473 A1  6/2010  Kwon et al.
(Continued)

FOREIGN PATENT DOCUMENTS

JP    2011-244309 A    12/2011
KR    10-2010-0069307 A    6/2010
(Continued)

OTHER PUBLICATIONS

Greg Ward, Fast, Robust Image Registration for Compositing High Dynamic Range Photographs from Handheld Exposures, Journal of Graphics Tools, vol. 8, pp. 17-30; Menlo Park, CA, USA; 2003.
(Continued)

*Primary Examiner* — Ahmed A Berhan
(74) *Attorney, Agent, or Firm* — Jefferson IP Law, LLP

(57) ABSTRACT

Provided is an image processing method for an electronic device having a camera module. The image processing method may include: acquiring a first image with a first exposure time by using a first pixel group; acquiring a second image with a second exposure time shorter than the first exposure time by using a second pixel group; determining whether the difference between the first exposure time and the second exposure time is greater than or equal to a preset threshold; acquiring, if the difference between the first exposure time and the second exposure time is greater than or equal to the preset threshold, a third image with a
(Continued)

third exposure time by using the second pixel group; and generating a high dynamic range (HDR) image by combining the first to third images.

15 Claims, 30 Drawing Sheets

(52) U.S. Cl.
CPC ............ *H04N 5/353* (2013.01); *H04N 5/355* (2013.01); *H04N 5/35554* (2013.01); *H04N 5/3532* (2013.01)

(56) References Cited

U.S. PATENT DOCUMENTS

| | | |
|---|---|---|
| 2010/0259636 A1 | 10/2010 | Tzur et al. |
| 2011/0169980 A1 | 7/2011 | Cho et al. |
| 2011/0176024 A1 | 7/2011 | Kwon et al. |
| 2012/0249844 A1 | 10/2012 | Saito et al. |
| 2012/0262600 A1* | 10/2012 | Velarde ................ H04N 5/2355 348/223.1 |
| 2012/0281111 A1 | 11/2012 | Jo et al. |
| 2014/0232929 A1* | 8/2014 | Ichikawa ............ H04N 5/2355 348/362 |
| 2014/0307117 A1 | 10/2014 | Feng et al. |
| 2015/0015754 A1 | 1/2015 | Fujita et al. |

FOREIGN PATENT DOCUMENTS

| | | |
|---|---|---|
| KR | 10-2011-0082421 A | 7/2011 |
| KR | 10-2011-0084025 A | 7/2011 |

OTHER PUBLICATIONS

Brian S. Eastwood et al., Image Alignment for Multiple Camera High Dynamic Range Microscopy, Applications of Computer Vision (WACV), 2012 IEEE Workshop on, pp. 225-232; Waterville ME, USA; Nov. 9, 2012.

* cited by examiner

LONG EXPOSURE PIXEL (710)

SHORT EXPOSURE PIXEL (720)

610

LONG EXPOSURE PIXEL (710)

SHORT EXPOSURE PIXEL (720)

LONG EXPOSURE PIXEL (710)

SHORT EXPOSURE PIXEL (720)

LONG EXPOSURE PIXEL (710)

SHORT EXPOSURE PIXEL (720)

LONG EXPOSURE PIXEL (710)

SHORT EXPOSURE PIXEL (720)

610

LONG EXPOSURE PIXEL (710)

SHORT EXPOSURE PIXEL (720)

610

LONG EXPOSURE PIXEL (710)

SHORT EXPOSURE PIXEL (720)

LONG EXPOSURE PIXEL (710)

SHORT EXPOSURE PIXEL (720)

LONG EXPOSURE PIXEL (710)

SHORT EXPOSURE PIXEL (720)

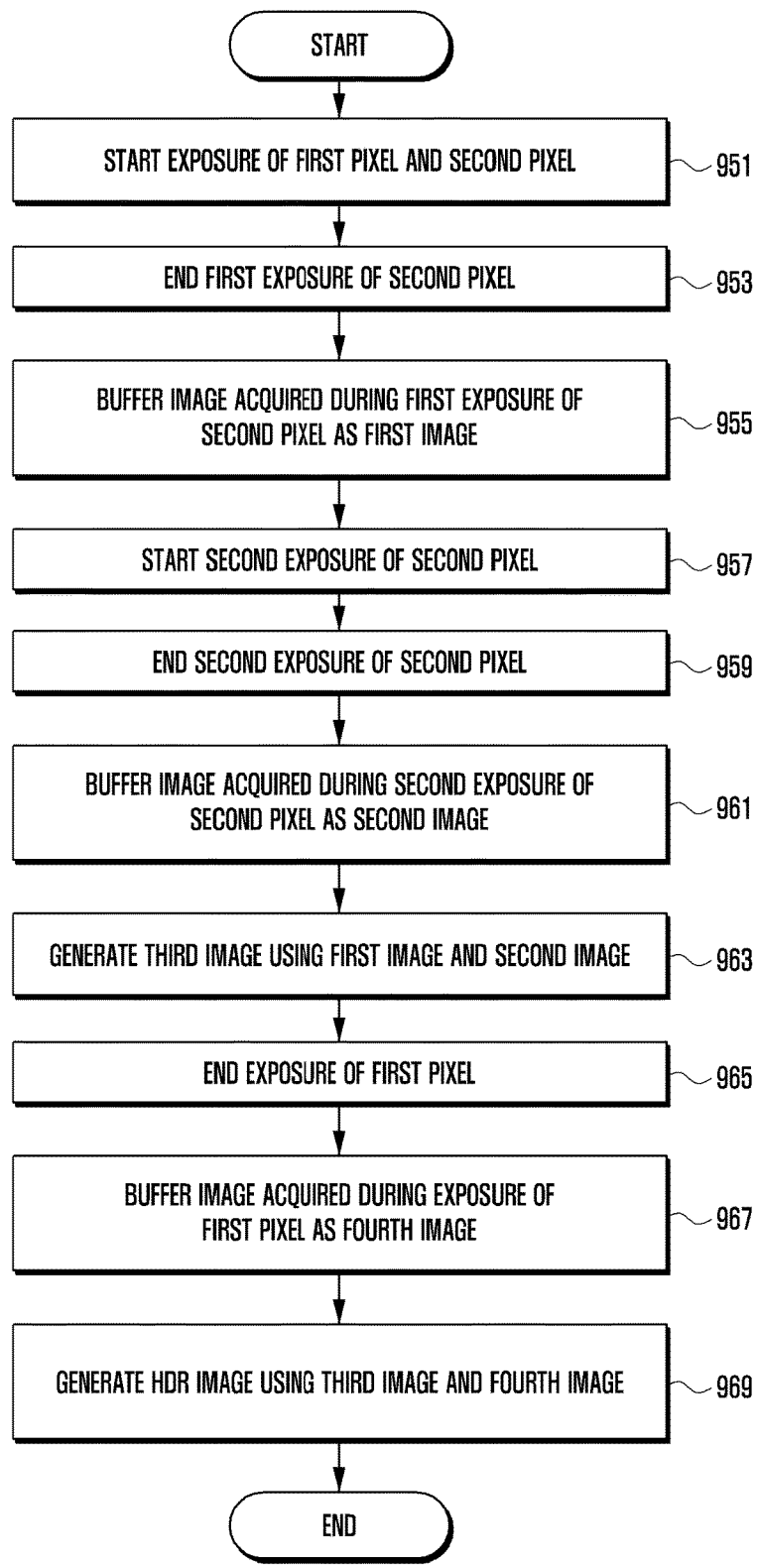

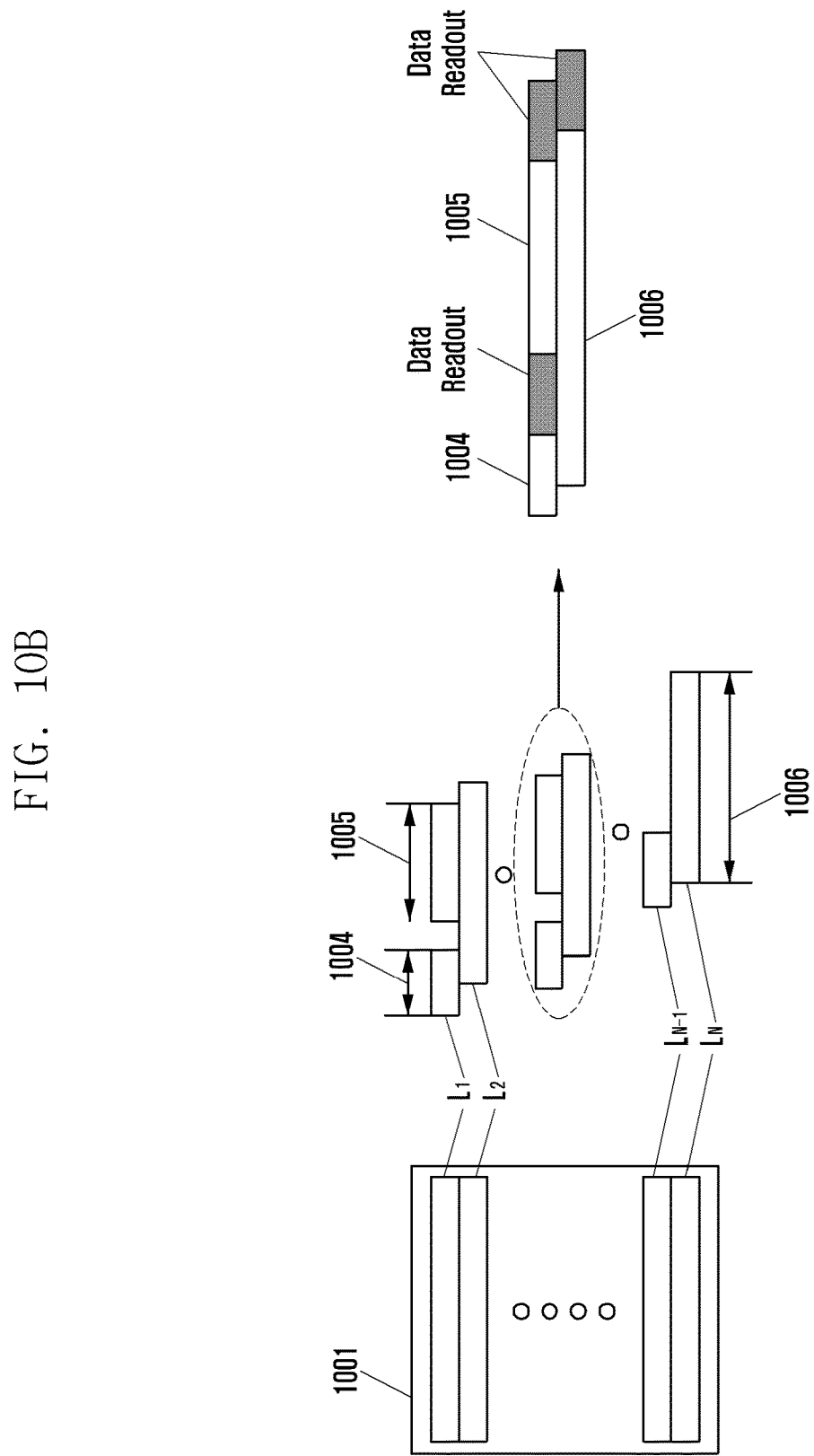

ELECTRONIC DEVICE HAVING CAMERA MODULE, AND IMAGE PROCESSING METHOD FOR ELECTRONIC DEVICE

TECHNICAL FIELD

The present invention relates to an electronic device having a camera module and an image processing method for the same.

BACKGROUND ART

In general, the dynamic range of an image may indicate a range that can represent the luminance from the dark portion to the bright portion in the image.

An electronic device can adjust the dynamic range of an image by adjusting pixels representing brightness of the image such as luminance. The electronic device may capture and synthesize two or more images with different amounts of exposure to thereby improve the dynamic range of the image. Such an image with an improved dynamic range is referred to as a high dynamic range (HDR) image.

DISCLOSURE OF INVENTION

Technical Problem

Generally, an electronic device including a camera may implement various functions related to the camera. However, the electronic device including a camera captures sequentially and synthesizes two or more images with different exposures to obtain one HDR image. Hence, the time for taking and synthesizing multiple images makes it difficult to preview an image to be photographed in real time or to shoot a moving image.

Accordingly, an aspect of the present invention is to provide an electronic device having a camera module that can produce an HDR image in real time by capturing and processing in real time a long exposure image and a short exposure image using combinations of long exposure pixels and short exposure pixels alternately arranged in the image sensor of the camera module.

Solution to Problem

In accordance with an aspect of the present invention, there is provided a method of image processing for an electronic device. The method may include acquiring a first image with a first exposure time by using a first pixel group; acquiring a second image with a second exposure time shorter than the first exposure time by using a second pixel group; determining whether the difference between the first exposure time and the second exposure time is greater than or equal to a preset threshold; acquiring, if the difference between the first exposure time and the second exposure time is greater than or equal to the preset threshold, a third image with a third exposure time by using the second pixel group; and generating a high dynamic range (HDR) image by combining the first to third images.

In accordance with another aspect of the present invention, there is provided an electronic device. The electronic device may include a camera module including an image sensor, and a processor including an image processor or an image signal processor (ISP). The processor may perform a procedure of acquiring through the camera module a first image with a first exposure time by using a first pixel group; acquiring through the camera module a second image with a second exposure time shorter than the first exposure time by using a second pixel group; determining whether the difference between the first exposure time and the second exposure time is greater than or equal to a preset threshold; acquiring through the camera module, if the difference between the first exposure time and the second exposure time is greater than or equal to the preset threshold, a third image with a third exposure time by using the second pixel group; and generating a high dynamic range (HDR) image by combining the first to third images.

Advantageous Effects of Invention

In a feature of the present invention, the image processing method enables the electronic device having a camera module to produce an HDR image having an improved dynamic range with low noise by capturing images using the image sensor of the camera module including pixels that have different exposures or differently controllable exposure times.

In another feature of the present invention, the image processing method permits the electronic device having a camera module to capture images by using the image sensor of the camera module including pixels that have different exposures or differently controllable exposure times, making it possible to produce an HDR image in real time. Hence, a preview function or HDR moving image shooting function can be provided to the user.

BRIEF DESCRIPTION OF DRAWINGS

FIGS. 9A to 9C are flowcharts of schemes for HDR image acquisition in the electronic device according to various embodiments of the present invention.

FIGS. 10A and 10B illustrate HDR image acquisition in the electronic device according to various embodiments of the present invention.

MODE FOR THE INVENTION

Figure 1:
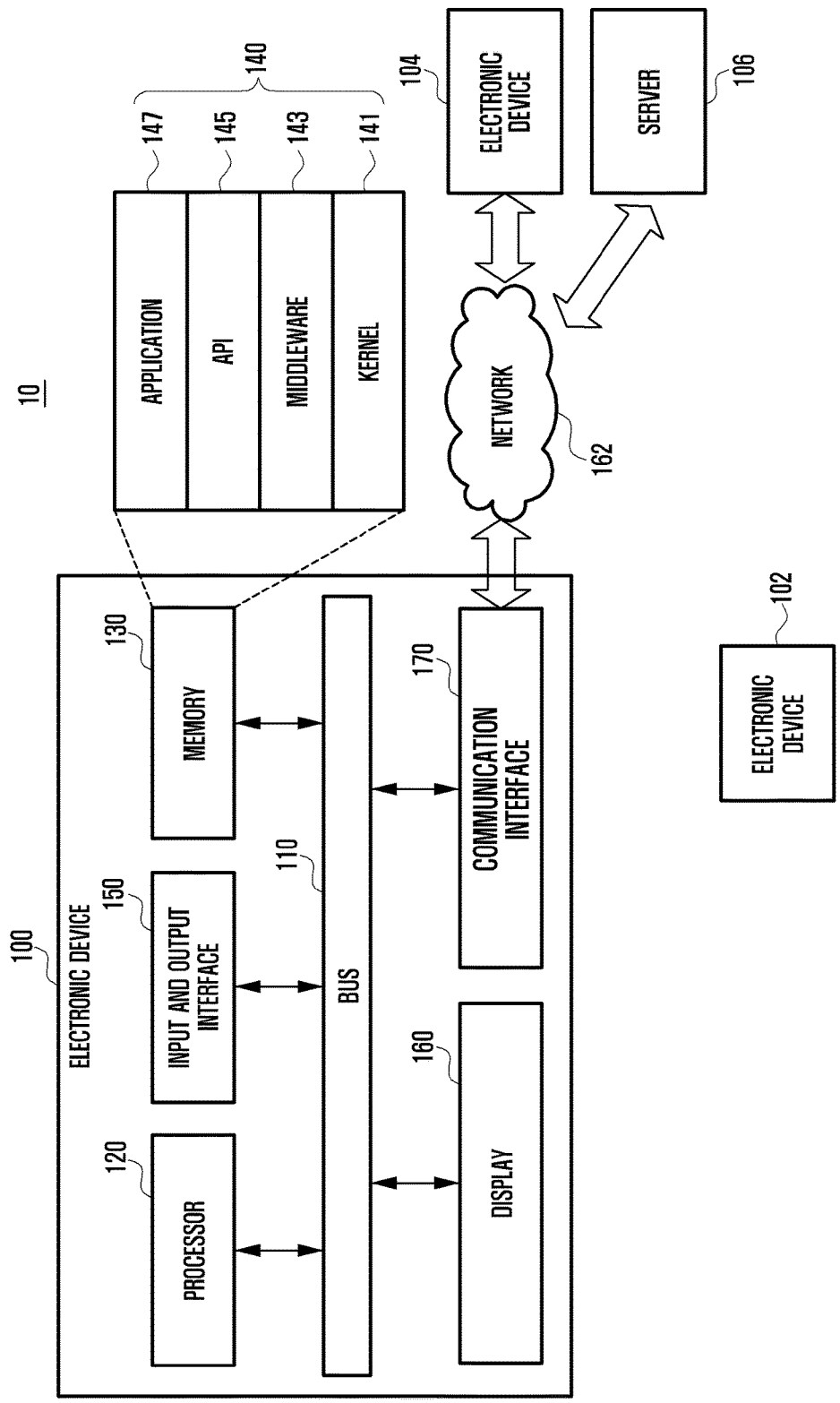
FIG. 1 illustrates a network environment including electronic devices according to an embodiment of the present invention.

Hereinafter, various embodiments of the present disclosure are described with reference to the accompanying drawings. However, it should be appreciated that the present disclosure is not limited to a specific embodiment and all modifications, equivalents and/or alternatives thereof also belong to the scope of the present disclosure. The same or similar reference symbols are used throughout the drawings to refer to the same or like parts.

In the description, an expression "have", "may have", "include" or "may include" indicates the existence of a specific feature (e.g. number, function, operation, or component like a part) and does not exclude the existence of other features.

In the description, the expression "A or B", "at least one of A and/or B", or "one or more of A and/or B" may indicate all possible combinations of A and B. For example, "A or B", "at least one of A and B", "at least one of A or B" may indicate any of (1) including at least one A, (2) including at least one B, or (3) including at least one A and at least one B.

In various embodiments, the terms "first" and "second" may modify various elements regardless of importance and/or order and are used to distinguish one element from another element without limitation. For example, a first user device and a second user device may indicate different user devices regardless of the order or importance of the devices. As another example, a first component may be denoted as a second component, and vice versa, without departing from the scope of the present disclosure.

It will be understood that when an element (e.g. first element) is referred to as being (operatively or communicatively) "coupled with/to" or "connected with/to" another element (e.g. second element), it can be coupled or connected with/to the other element directly or via a third element. In contrast, it will be understood that when an element (e.g. first element) is referred to as being "directly coupled with/to" or "directly connected with/to" another element (e.g. second element), no other element (e.g. third element) intervenes between the element and the other element.

In the description, the phrase "configured (or set) to" may be used interchangeably with the phrase "suitable for", "having the capacity to", "designed to", "adapted to", "made to" or "capable of", depending on circumstances. The term "configured (or set) to" does not essentially mean "specifically designed in hardware to." Rather, the phrase "configured to" may mean that a device can perform a specific operation together with other devices or parts. For example, the phrase "processor configured (or set) to perform A, B, and C" may mean a dedicated processor (e.g. embedded processor) for performing the operations or a general-purpose processor (e.g. central processing unit (CPU) or application processor) that may perform the operations by executing one or more software programs stored in a memory unit.

Some terms used herein may be provided merely to describe a specific embodiment without limiting the scope of another embodiment. In the description, the singular forms "a", "an" and "the" are intended to include the plural forms as well, unless the context clearly indicates otherwise. The terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In any case, the terms defined herein should not be interpreted to exclude certain embodiments of the present disclosure.

Various embodiments of the present invention may provide an electronic device capable of capturing and producing images with a high dynamic range (HDR). To capture and produce an HDR image, an electronic device in some embodiments may include a new image sensor and image processing apparatus.

In various embodiments, the electronic device may have a first pixel group and a second pixel group in the image sensor, where pixels of the first pixel group and pixels of the second pixel group may be alternately arranged in a regular or irregular manner. The first pixel group may include at least one first pixel and the second pixel group may include at least one second pixel. The first pixel and the second pixel are different in terms of the amount of exposure or exposure time. In one embodiment, the amount of exposure of the first pixel is larger than that of the second pixel. In one embodiment, the exposure time of the first pixel is longer than that of the second pixel. In one embodiment, the first pixel may be referred to as a long exposure pixel because it has a larger exposure amount or a longer exposure time than the second pixel, and the first pixel group including at least one first pixel may be referred to as a long exposure pixel group. In addition, the second pixel may be referred to as a short exposure pixel because it has a smaller exposure amount or a shorter exposure time than the first pixel, and the second pixel group including at least one second pixel may be referred to as a short exposure pixel group.

In various embodiments, the electronic device may assign different exposure amounts to the pixels of the first pixel group and the pixels of the second pixel group according to the dynamic range of the bright and dark regions of the image formed on the image sensor. In one embodiment, the exposure amounts of the first pixel group and the second pixel group may be set according to at least one of exposure time and photoelectric conversion efficiency.

In one embodiment, the electronic device may further configure a third pixel group whose pixel detects the target object image for an exposure time shorter than that of the first pixel group and longer than that of the second pixel group. In one embodiment, the pixel of the third pixel group detecting the target object image for an exposure time shorter than that of the first pixel group and longer than that of the second pixel group may be operated using a second pixel.

In one embodiment, among the pixels of the image formed on the image sensor, the electronic device may arrange those pixels whose output value is set greater than a preset threshold as pixels of the first pixel group and arrange those pixels whose output value is set less than the preset threshold as pixels of the second pixel group.

In one embodiment, the electronic device may dynamically arrange first pixels belonging to the first pixel group and second pixels belonging to the second pixel group.

In one embodiment, the pixels belonging to the first pixel group and the pixels belonging to the second pixel group may be arranged in a repetitive pattern or in an irregular pattern in the image sensor.

In one embodiment, while the pixels of the first pixel group are exposed, the pixels of the second pixel group may acquire the exposure image at least twice with different exposure times.

In one embodiment, while the pixels of the first pixel group are exposed, the pixels of the second pixel group may acquire one image and then further acquire one or more images.

In one embodiment, the electronic device may configure a region of interest in the pixels of the image formed on the image sensor and arrange more pixels of the first pixel group than pixels of the second pixel group in the region of interest.

In one embodiment, the electronic device may identify whether the camera module is underexposed or overexposed to the lighting condition for image capture and determine whether to acquire an image in auto exposure (AE) mode or in HDR mode accordingly.

In various embodiments of the present disclosure, the electronic device may be a smartphone, tablet personal computer, mobile phone, video phone, e-book reader, desktop personal computer, laptop personal computer, netbook computer, workstation, server, personal digital assistant (PDA), portable multimedia player (PMP), MP3 player, mobile medical device, camera, or wearable device (e.g. smart glasses, HMD (head-mounted device), electronic clothes, electronic bracelet, electronic necklace, electronic appcessory, electronic tattoo, smart mirror, or smart watch).

In some embodiments, the electronic device may be a smart home appliance. For example, the electronic device may be a TV, DVD (digital video disk) player, audio equipment, refrigerator, air conditioner, vacuum cleaner, oven, microwave oven, washing machine, air cleaner, set-top box, home automation control panel, TV box (e.g. Samsung HomeSync™, Apple TV™, Google TV™), game console (e.g. Xbox™, PlayStation™), electronic dictionary, electronic key, camcorder, or electronic picture frame.

In other embodiments, the electronic device may be a medical device (e.g. portable medical measuring device such as a blood sugar measuring device, heartbeat measuring device, blood pressure measuring device, or body temperature measuring device), MRA (magnetic resonance angiography) system, MRI (magnetic resonance imaging) system, CT (computed tomography) system, radiograph instrument, ultrasonography instrument, navigation device, GPS (global positioning system) receiver, EDR (event data recorder), FDR (flight data recorder), car infotainment device, ship electronic equipment (e.g. marine navigation system, gyrocompass), avionics, security equipment, car head unit, or industrial or home robot, automatic teller machine (ATM), point of sales (POS) device, or IoT (Internet of Things) device (e.g. bulb, sensor, electric or gas meter, sprinkler, fire alarm, thermostat, street light, toaster, fitness equipment, hot water tank, heater, or boiler).

In some embodiments, the electronic device may be a piece of furniture, or part of a building or structure, electronic board, electronic signature receiving device, projector, or measurement instrument (e.g. water meter, electric meter, gas meter, wave meter). In various embodiments, the electronic device may be one of the above-listed devices or a combination thereof. In some embodiments, the electronic device may be a flexible electronic device. The electronic device disclosed herein is not limited to the above-listed devices, and may be a new electronic device to be developed according to technological advances.

Next, a description is given of an electronic device according to various embodiments with reference to the accompanying drawings. In the present specification, the term "user" may denote a human or another device (e.g. artificial intelligence electronic device) using the electronic device.

FIG. 1 depicts an electronic device 100 in a network environment 10 according to various embodiments of the present invention. The electronic device 100 may include a bus 110, a processor 120, a memory 130, an input/output interface 150, a display 160, and a communication interface 170. In some embodiments, the electronic device 100 may not include one or more of the above components or may further include another component.

The bus 110 may be a circuit interconnecting the above components 110 to 170 for intercommunication therebetween (e.g. exchange of control messages and/or data).

The processor 120 may include one or more of a central processing unit (CPU), an application processor (AP), and a communication processor (CP). For example, the processor 120 may perform operations on control, communication and/or data processing for at least one component of the electronic device 100.

The memory 130 may include a volatile memory and/or a non-volatile memory. For example, the memory 130 may store instructions and/or data related to at least one component of the electronic device 100. In one embodiment, the memory 130 may store software and/or programs 140. For example, the programs 140 may include a kernel 141, middleware 143, an application programming interface (API) 145, and/or an application program (or "application") 147. At least a portion of the kernel 141, the middleware 143, and the API 145 may be referred to as an operating system (OS).

For example, the kernel 141 may control or manage system resources (e.g. bus 110, processor 120, or memory 130) that are used to perform operations or functions implemented in the programs 140 (e.g. middleware 143, API 145, or application program 147). The kernel 141 may provide an interface that permits the middleware 143, the API 145, or the application 147 to access individual components of the electronic device 100 for controlling or managing the system resources.

The middleware 143 may function as a relay enabling, for example, the API 145 or the application 147 to exchange data with the kernel 141 through communication. In addition, as part of controlling processing requests from the application programs 147, the middleware 132 may schedule or load balance system resources (e.g. bus 110, processor 120, and memory 130) of the electronic device 100 by, for example, assigning priorities to the application programs 147 making requests for accessing the system resources.

The API 145 is an interface that allows the application 147 to control functions provided from the kernel 141 or the middleware 143. For example, the API 133 may include at least one interface or function (e.g. command) for file control, window control, image processing or text control.

The input/output interface 150 may serve as an interface that may transfer commands or data input from the user or an external device to other component(s) of the electronic device 100. Further, the input/output interface 150 may output commands or data from other component(s) of the electronic device 100 to the user or an external device.

The display 160 may include, for example, a liquid crystal display (LCD), a light emitting diode (LED) display, an organic light emitting diode (OLED) display, a microelectromechanical systems (MEMS) display, or an electronic paper display. The display 160 may display various pieces of content (e.g. text, image, video, icon, and symbol) for the user. The display 160 may include a touchscreen and may receive, e.g., a touch input, gesture input, proximity input, or hovering input using an electronic pen or a portion of the user body.

The communication interface 170 may set up communication between the electronic device 100 and an external device (e.g. first external electronic device 102, second external electronic device 104, or server 106). For example, the communication interface 170 may be connected with the network 162 through wireless or wired communication and communicate with an external device (e.g. second external electronic device 104 or server 106). As another example, the communication interface 170 may communicate with an external device (e.g. first external electronic device 102) through wireless or wired communication.

Wireless communication may use a cellular communication protocol based on at least one of, for example, Long Term Evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). Wired communication may use at least one of, for example, USB (universal serial bus), HDMI (high definition multimedia interface), RS-232 (recommended standard 232), and POTS (plain old telephone service). The network 162 may include at least one of, for example, a telecommunications network, a computer network (e.g. local area network (LAN) or wide area network (WAN)), the Internet, and a telephone network.

Each of the first and second external electronic devices 102 and 104 may be the same type of device as or a different type of device from the electronic device 100. In one embodiment, the server 106 may be a group of one or more servers. In various embodiments, all or part of the operations performed on the electronic device 100 may be performed on one or more other electronic devices (e.g. electronic device 102, electronic device 104, or server 106). In one embodiment, when the electronic device 100 has to perform a specific function or service automatically or upon request, instead of or in addition to directly executing the function or service, the electronic device 100 may request a different electronic device (e.g. electronic device 102 or 104, or server 106) to perform at least a part of the function or service. The different electronic device (e.g. electronic device 102 or 104, or server 106) may execute the requested or additional function and return the result to the electronic device 100. The electronic device 100 may directly or additionally process the received result to provide the requested function or service. To this end, technologies such as cloud computing, distributed computing, and client-server computing may be utilized.

Figure 2A:
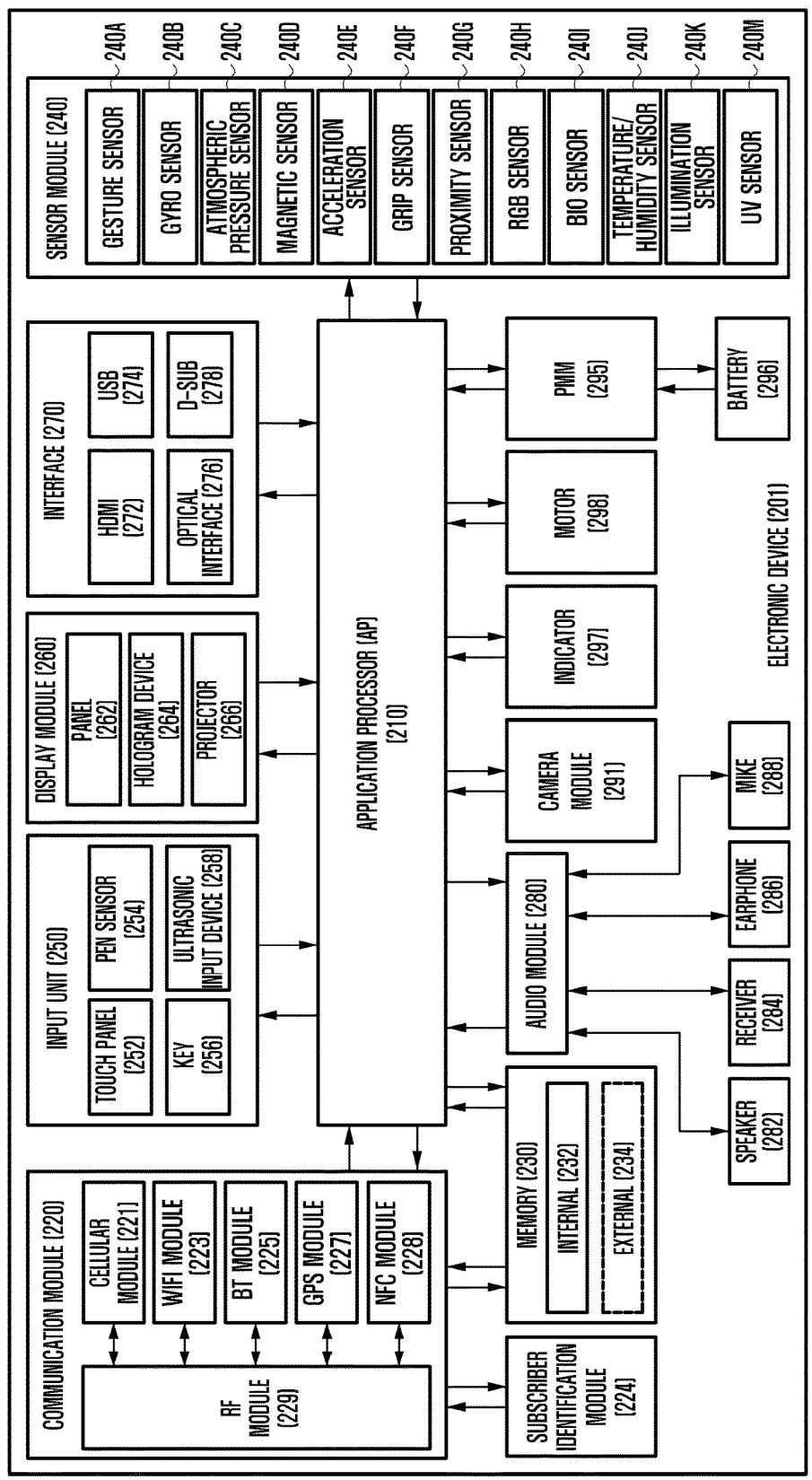
FIGS. 2A and 2B are block diagrams of an electronic device according to various embodiments of the present invention.

FIG. 2A is a block diagram of an electronic device 200 according to various embodiments. The electronic device 200 may include all or part of, e.g., the electronic device 100 shown in FIG. 1. The electronic device 201 may include one or more application processors (APs) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may control multiple hardware and software components connected thereto by running, e.g., the operating system or application programs, and perform various data processing operations and computations. The AP 210 may be implemented in, e.g., a system on chip (SoC). The AP 210 may further include a graphics processing unit (GPU) and/or an image signal processor. The AP 210 may include at least one of the components shown in FIG. 2A (e.g. cellular module 221). The AP 210 may load a command or data from at least one of other components (e.g. non-volatile memory) on a volatile memory to process the command or data, and store various data in the non-volatile memory. The AP 210 of FIG. 2A may have a configuration identical or similar to that of the processor 120 of FIG. 1.

The communication module 220 may have a configuration identical or similar to the communication interface 170 of FIG. 1. The communication module 220 may include, e.g., a cellular module 221, a Wi-Fi module 223, a Bluetooth module 225, a GPS module 227, an NFC module 228, and a radio frequency (RF) module 229.

The cellular module 221 may provide, e.g., a voice call service, a video call service, a text message service, or an Internet service through a communication network. In one embodiment, the cellular module 221 may identify and authenticate the electronic device 200 on the communication network using a subscriber identification module (e.g. SIM card 224). In one embodiment, the cellular module 221 may perform at least some of the functions providable by the AP 210. In one embodiment, the cellular module 221 may include a communication processor (CP).

The Wi-Fi module 223, the Bluetooth module 225, the GPS module 227, and the NFC module 228 may each have a processor to handle corresponding data for communication. In one embodiment, at least some (e.g., two or more) of the cellular module 221, the Wi-Fi module 223, the Bluetooth module 225, the GPS module 227, and the NFC module 228 may be included in a single integrated circuit (IC) or an IC package.

The RF module 229 may send and receive communication signals (e.g. RF signals). The RF module 229 may include, e.g., a transceiver, a power amp module (PAM), a frequency filter, a low noise amplifier (LNA), and an antenna. In another embodiment, at least one of the cellular module 221, the Wi-Fi module 223, the Bluetooth module 225, the GPS module 227, and the NFC module 228 may send and receive RF signals through a separate RF module.

The SIM card 224 may be a card including a subscriber identification module and/or an embedded SIM, and it may contain unique identification information (e.g. integrated circuit card identifier (ICCID)) or subscriber information (e.g. international mobile subscriber identity (IMSI)).

The memory 230 (e.g. memory 130) may include, for example, an internal memory 232 or an external memory 234. The internal memory 232 may include at least one of a volatile memory (e.g. dynamic random access memory (DRAM), static RAM (SRAM), synchronous dynamic RAM (SDRAM)) or a non-volatile memory (e.g. one time programmable read only memory (OTPROM), programmable ROM (PROM), erasable and programmable ROM (EPROM), electrically erasable and programmable ROM (EEPROM), mask ROM, flash ROM, flash memory (e.g. NAND flash, NOR flash), hard drive, or solid state drive (SSD)).

The external memory 234 may include a flash drive, e.g. compact flash (CF) memory, secure digital (SD) memory, micro-SD memory, mini-SD memory, extreme digital (xD) memory, or memory stick. The external memory 234 may be functionally and/or physically connected with the electronic device 200 via various interfaces.

The sensor module 240 may measure a physical quantity or monitor an operational state of the electronic device 200, and it may convert the measured or monitored information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g. red-green-blue (RGB) sensor), a bio sensor 240I, a temperature/humidity sensor 240J, an illumination sensor 240K, and an ultra violet (UV) sensor 240M. The sensor module 240 may additionally or alternatively include, e.g., an E-nose sensor, an electromyography (EMG) sensor, an electroencephalogram (EEG) sensor, an electrocardiogram (ECG) sensor, an infrared (IR) sensor, an iris sensor, and a fingerprint sensor. The sensor module 240 may further include a control circuit for controlling one or more of the sensors included in the sensor module 240. In one embodiment, the electronic device 200 may further include a processor configured to control the sensor module 240 as part of the AP 210 or as a separate entity, and the processor may control the sensor module 240 while the AP 210 is in sleep state.

The input unit 250 may include, e.g., a touch panel 252, a (digital) pen sensor 254, a key 256, and an ultrasonic input tool 258. The touch panel 252 may use at least one of capacitive, resistive, infrared, and ultrasonic schemes. The touch panel 252 may further include a control circuit. The touch panel 252 may further include a tactile layer to provide the user with a tactile response.

The (digital) pen sensor 254 may include, e.g., a recognition sheet as part of the touch panel or as a separate entity. The key 256 may include, e.g., a physical button, optical key, or key pad. The ultrasonic input tool 258 may be used to identify data by sensing sound waves picked up by a microphone (e.g. microphone 288) through an input tool generating ultrasonic waves.

The display 260 (e.g. display 160 of FIG. 1) may include a panel 262, a hologram unit 264, and a projector 266. The panel 262 may have a configuration identical or similar to that of the display 160 of FIG. 1. The panel 262 may be implemented to be flexible, transparent, or wearable. The panel 262 may be combined with the touch panel 252 as a single module. The panel 262 and the touch panel 252 combined as a single module may be referred to as a touch sensitive device or a touchscreen. The hologram unit 264 may present three dimensional images in the air by using interference of light. The projector 266 may display an image by projecting light onto a screen. The screen may be located inside or outside the electronic device 200. In one embodiment, the display 260 may further include a control circuit to control the panel 262, the hologram unit 264, or the projector 266.

The interface 270 may include, e.g., a high definition multimedia interface (HDMI) 272, a universal serial bus (USB) 274, an optical interface 276, and a D-subminiature (D-sub) 278. The interface 270 may be included in, e.g., the communication interface 170 shown in FIG. 1. The interface 270 may additionally or alternatively include a mobile high-definition link (MHL) interface, a secure digital (SD) card/multimedia card (MMC) interface, or infrared data association (IrDA) standard interface.

The audio module 280 may convert a sound into an electrical signal or vice versa, for example. At least a part of the audio module 280 may be included in, e.g., the input/output interface 150 shown in FIG. 1. The audio module 280 may process sound information input or output through, e.g., the speaker 282, receiver 284, earphone 286, or microphone 288.

The camera module 291 is a device for, e.g., capturing still and moving images, and may include, in one embodiment, one or more image sensors (e.g. front and back sensors), a lens, an image signal processor (ISP), and a flash (e.g. LED or xenon lamp).

The power management module 295 may manage power of the electronic device 200. In one embodiment, the power management module 295 may include a power management integrated circuit (PMIC), a charger IC, and a battery or fuel gauge. The PMIC may use a wired and/or wireless charging scheme. The wireless charging scheme may employ, e.g., a magnetic resonance scheme, a magnetic induction scheme, or an electromagnetic wave based scheme, and may further employ a supplementary circuit for wireless charging, such as a coil loop, a resonance circuit, or a rectifier. The battery gauge may measure, e.g., the remaining power, voltage, current, or temperature of the battery 296 while the battery 296 is being charged. The battery 296 may include, e.g., a rechargeable battery and/or a solar battery.

The indicator 297 may indicate a specific state of the electronic device 200 or a part thereof (e.g. AP 210), such as a booting state, message state, or charging state. The motor 298 may convert an electrical signal to a mechanical vibration to generate vibrations or haptic effects. Although not shown, the electronic device 200 may include a processor (e.g. GPU) for supporting mobile TV. The processor for mobile TV may process media data conforming to the standard such as digital multimedia broadcasting (DMB), digital video broadcasting (DVB), or MediaFlo.

Each component of the electronic device described above may be composed of one or more elements, and component names may be varied according to the type of the electronic device. In various embodiments, the electronic device may be configured to include at least one of the aforementioned components, and an existing component may be omitted and a new component may be added. In various embodiments, some of the components of the electronic device may be combined into one entity while maintaining the same functionality.

Figure 2B:
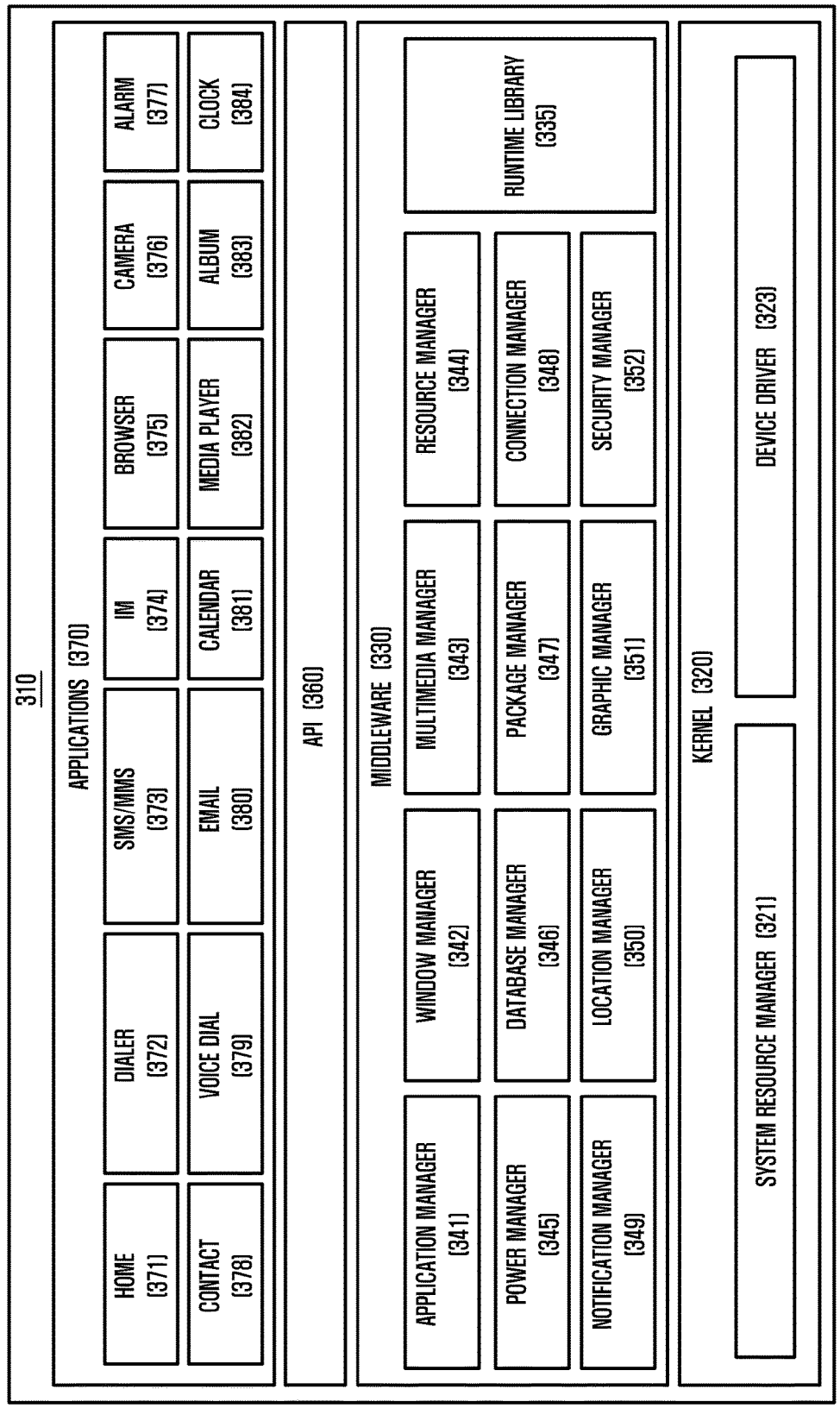

FIG. 2B is a block diagram illustrating a software configuration 310 according to various embodiments of the present invention. In one embodiment, the software configuration 310 (e.g. programs 140) may be composed of an operating system (OS) controlling resources related to the electronic device (e.g. electronic device 100) and/or various applications (e.g. application programs 147) running on the operating system. The operating system may be, e.g., Android, iOS, Windows, Symbian, Tizen, or Bada.

The software configuration 310 may be composed of a kernel 320, middleware 330, an application programming interface (API) 360, and/or applications 370. At least a portion of the software configuration 310 may be preloaded on the electronic device or may be downloaded from a server (e.g. server 106 of FIG. 1).

The kernel 320 (e.g. kernel 141 of FIG. 1) may include, e.g., a system resource manager 391 and/or a device driver 393. The system resource manager 391 may control, allocate, or reclaim system resources. In one embodiment, the system resource manager 391 may include a process manager, a memory manager, and a file system manager. The device driver 393 may include, e.g., a display driver, a camera driver, a Bluetooth driver, a shared memory driver, a USB driver, a keypad driver, a Wi-Fi driver, an audio driver, and an inter-process communication (IPC) driver.

The middleware 330 may provide functions commonly needed by the applications 370, or may provide various functions to the applications 370 through the API 360 so that the applications 370 can efficiently use limited system resources in the electronic device. In one embodiment, the middleware 330 (e.g. middleware 143 of FIG. 1) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include library modules that can be used by a compiler to add a new function through a programming language during application execution. The runtime library 335 may perform input/output management, memory management, or operations on arithmetic functions.

The application manager 341 may manage the life cycle of at least one application of, e.g., the applications 370. The window manager 342 may manage GUI resources used for the screen, such as windows. A window is a visual area of a given shape in the electronic device 200. Windows may be associated with various types of user interfaces (UI). A window may provide an input to a corresponding process among many processes running in parallel and display an output produced from the process. The window manager 342 may control the placement or appearance of a window or UI created by an application 370 on the display 160. When an application 370 creates a window or UI to be displayed, the window manager 342 may control the position, size, layout, or sequence of the window or UI on the display 160. The multimedia manager 343 may identify the format of a media file for playback and perform encoding and decoding of the media file using a codec matching the identified format. The resource manager 344 may manage resources, such as source codes, memory space, and storage space, needed by at least one of the applications 370.

The power manager 345 may operate in cooperation with, e.g., the basic input/output system (BIOS) to manage the power source such as the battery and provide power information needed for operation of the electronic device. The database manager 346 may permit at least one of the applications 370 to create, search, and update a database. The package manager 347 may manage installation and update of an application distributed in a package file format.

The connectivity manager 348 may manage wireless links based on, for example, Wi-Fi or Bluetooth. The notification manager 349 may notify the user of events such as message reception, appointment arrival, and proximity in a non-disruptive manner. The location manager 350 may manage location information of the electronic device. The graphics manager 351 may manage graphical effects for the user and manage user interfaces related thereto. The security manager 352 may provide various security functions needed for system security or user authentication. In one embodiment, when the electronic device (e.g. electronic device 100) supports telephony functionality, the middleware 330 may further include a telephony manager to manage voice or video call functions of the electronic device.

The middleware 330 may include a middleware module forming a combination of various functions of the above-described components. To provide differentiated functions, the middleware 330 may provide modules adapted to the types of operating systems. The middleware 330 may delete an existing component or add a new component in a dynamic manner.

The API 360 (e.g. API 145 in FIG. 1) is a set of API functions and may be configured differently according to the operating systems. For example, Android and iOS may provide one API set for each platform, and Tizen may provide two or more API sets for each platform.

The applications 370 (e.g. application programs 147 in FIG. 1) may include one or more applications supporting functions regarding, for example, home 371, dialer 372, SMS/MMS 373, instant messaging (IM) 374, browser 375, camera 376, alarm 377, contacts 378, voice dial 379, email 380, calendar 381, media player 382, album 383, clock 384, event 385, notification 386, health-care (e.g., measuring the amount of workout or blood sugar), and environmental information (e.g., air pressure, humidity, or temperature).

In one embodiment, the applications 370 may include an application supporting information exchange between the electronic device (e.g. electronic device 100) and an external electronic device (e.g. electronic device 102 or 104) (referred to as "information exchange application" for ease of description). The information exchange application may include, e.g., a notification relay application for sending specific information to an external electronic device, and a device management application for managing external electronic devices. In another embodiment, the electronic device 200 may use the event application 385 or the notification application 386 to exchange information with an external electronic device (e.g. electronic device 102 or 104).

For example, the notification relay application may have a function for delivering notification information generated from other applications (e.g. SMS/MMS application, email application, health-care application, or environmental information application) to an external electronic device (e.g. electronic device 102 or 104). The notification relay application may also deliver notification information received from an external electronic device to the user. For example, the device management application may manage at least one function (e.g. device or component turn-on/off, display brightness or resolution adjustment) of an external electronic device (e.g. electronic device 104) communicating with the electronic device, manage (e.g. install, uninstall or update) an application running on the external electronic device, or manage a service (e.g. call or message service) provided by the external electronic device.

In one embodiment, the applications 370 may include an application (e.g. healthcare application) designated according to an attribute (e.g. mobile medical appliance as attribute or device type) of an external electronic device (e.g. electronic device 102 or 104). In one embodiment, the applications 370 may include an application received from an external electronic device (e.g. server 106, electronic device 102 or 104). In one embodiment, the applications 370 may include a preloaded application or a third party application downloadable from a server. Component names of the software configuration 310 may be varied according to types of operating systems.

In various embodiments, at least a portion of the software configuration 310 may be implemented in software, firmware, hardware, or a combination thereof. At least a portion of the software configuration 310 may be implemented (e.g. executed) by a processor (e.g. AP 210). At least a portion of the software configuration 310 may include a module, a program, a routine, a set of instructions, or a process supporting one or more functions.

I. Invocation of Normal AE Mode and HDR Mode, and HDR Histogram

Figure 3A:
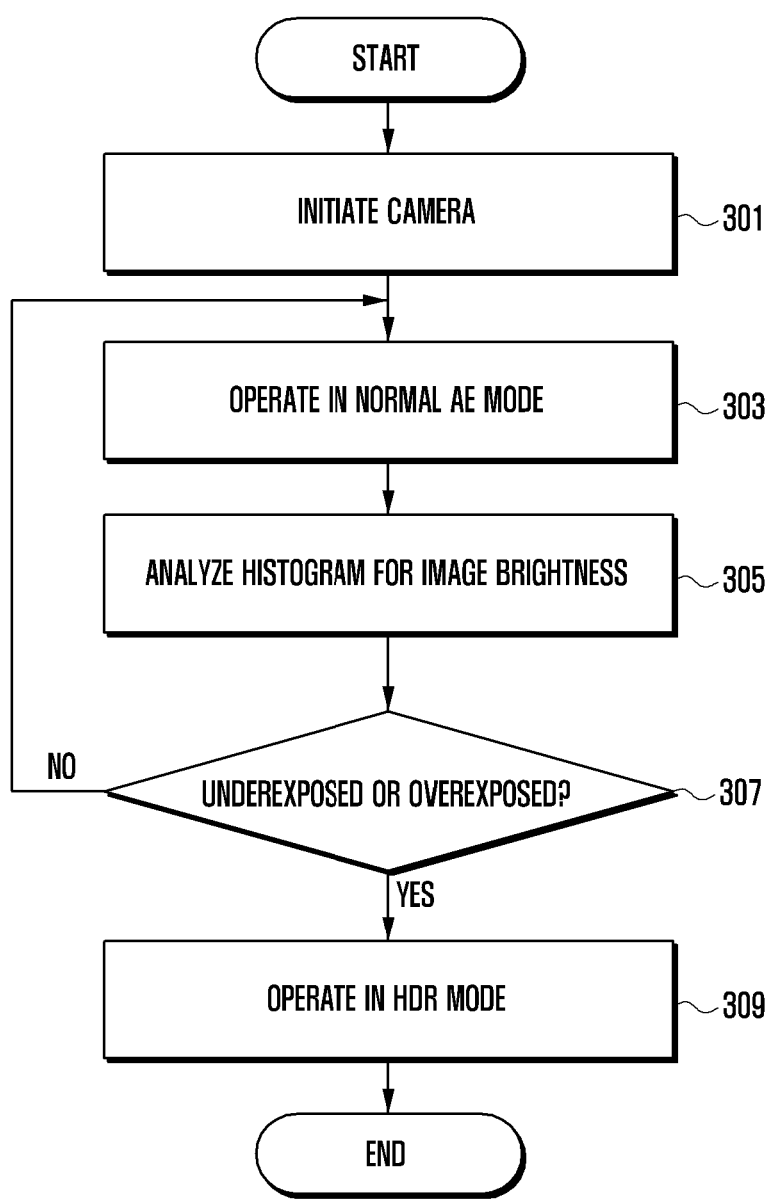
FIG. 3A is a flowchart for invoking HDR mode in the electronic device according to various embodiments of the present invention.

FIG. 3A is a flowchart for invoking HDR mode in the electronic device 200 according to various embodiments of the present invention. FIGS. 5A to 5D are histograms of brightness of images according to various embodiments of the present invention.

At operation 301, the electronic device 200 may initiate the camera function. When the camera function is initiated, the electronic device 200 may receive light through the lens. The received light reaches the image sensor, and the image sensor can detect the photon and convert it into an electrical signal. The sensed light may be converted into digital information such as brightness, color, and coordinates depending upon the intensity and position. Here, the image sensor may be a photoelectric conversion device in the form of an integrated circuit fabricated using manufacturing techniques for semiconductor devices.

At operation 303, the electronic device 200 may operate in normal AE mode. In normal AE mode, the camera can automatically adjust exposure settings by measuring the appropriate exposure for the target object.

In photography, exposure may indicate the amount of light sensed by the image sensor. Exposure can be comprehensively determined by the sensitivity of the image sensor, the F value of the lens (i.e. the degree of opening of the aperture), and the shutter speed of the camera module.

If manual exposure mode is used, it may be difficult for the user to individually adjust the sensitivity of the image sensor, the F value of the lens, and the shutter speed of the camera module. Hence, the electronic device 200 may provide normal AE (auto exposure) mode in preference to manual exposure mode for user convenience.

The electronic device 200 may provide normal AE mode by use of an exposure meter such as a through-the-lens (TTL) meter.

At operation 305, the electronic device 200 may analyze an HDR histogram. In a histogram for image brightness shown in FIG. 5A, the bin indicates the amount of exposure and the frequency indicates the number of pixels, and the role of the x-axis and y-axis may be reversed. This histogram may be a kind of image histogram, such as a color histogram representing the color distribution per pixel. The electronic device 200 may analyze the brightness histogram of an image acquired in normal AE mode at operation 305. The electronic device 200 may determine the amount of exposure of the acquired image on the basis of analysis results of the brightness histogram.

In one embodiment, the electronic device 200 may analyze an image acquired in normal AE mode at operation 305. The electronic device 200 may analyze an image acquired in normal AE mode and determine the amount of exposure of the acquired image.

At operation 307, the electronic device 200 may determine whether the image obtained in normal AE mode is underexposed or overexposed. The electronic device 200 may perform HDR histogram analysis to determine whether the image obtained in normal AE mode is underexposed or overexposed. In one embodiment, through HDR histogram analysis, the electronic device 200 may determine that the image is underexposed when the number of pixels whose exposure amount is less than a preset threshold is large, and determine that the image is overexposed when the number of pixels whose exposure amount is greater than the threshold is large.

In one embodiment, the electronic device 200 may determine whether the image obtained in normal AE mode corresponds to at least one of underexposure and overexposure at operation 307.

If the image obtained in normal AE mode is neither underexposed nor overexposed, the procedure returns to operation 303, at which the electronic device 200 may continue to operate in normal AE mode.

If the image obtained in normal AE mode is underexposed or overexposed, the procedure proceeds to operation 309 at which the electronic device 200 operates in HDR mode.

In one embodiment, pixels of an image may correspond to pixels of the image sensor. When an image contains an overexposed region, the electronic device 200 may reduce the exposure time of at least one of short exposure pixels of the image sensor corresponding to the overexposed region of the image to obtain an image with less overexposure. Although the brightness histogram shown in FIG. 5A for an image obtained in normal AE mode shows a large number of pixels in the overexposed region, by decreasing the exposure time of at least one of short exposure pixels of the image sensor, the electronic device 200 may acquire an image with less overexposure as shown by the brightness histogram of FIG. 5B.

Figure 5A:
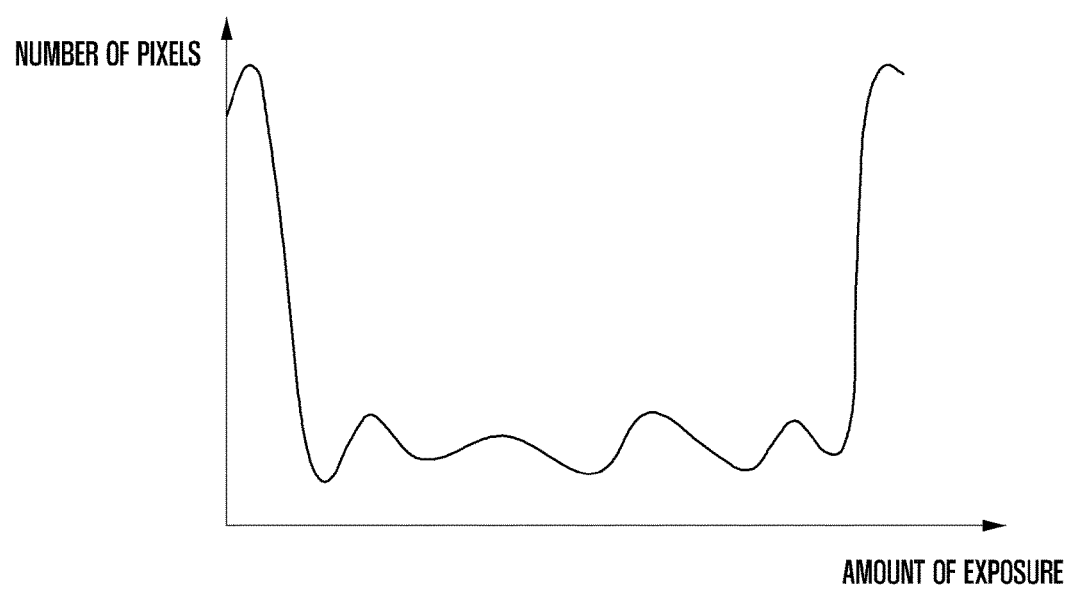
FIGS. 5A to 5D are histograms of brightness of images according to various embodiments of the present invention.
Figure 5B:
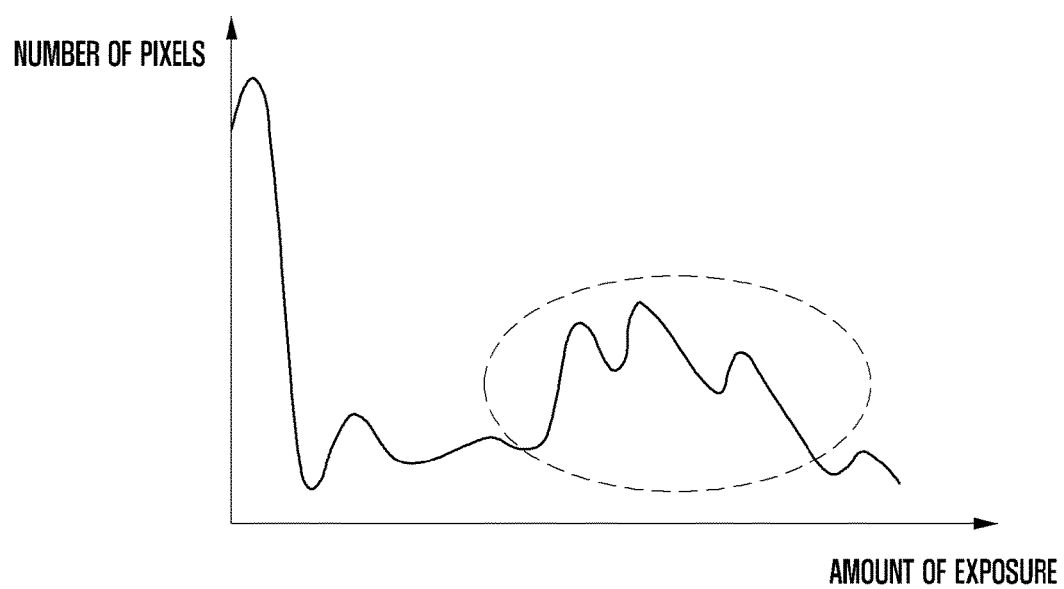
Figure 5C:
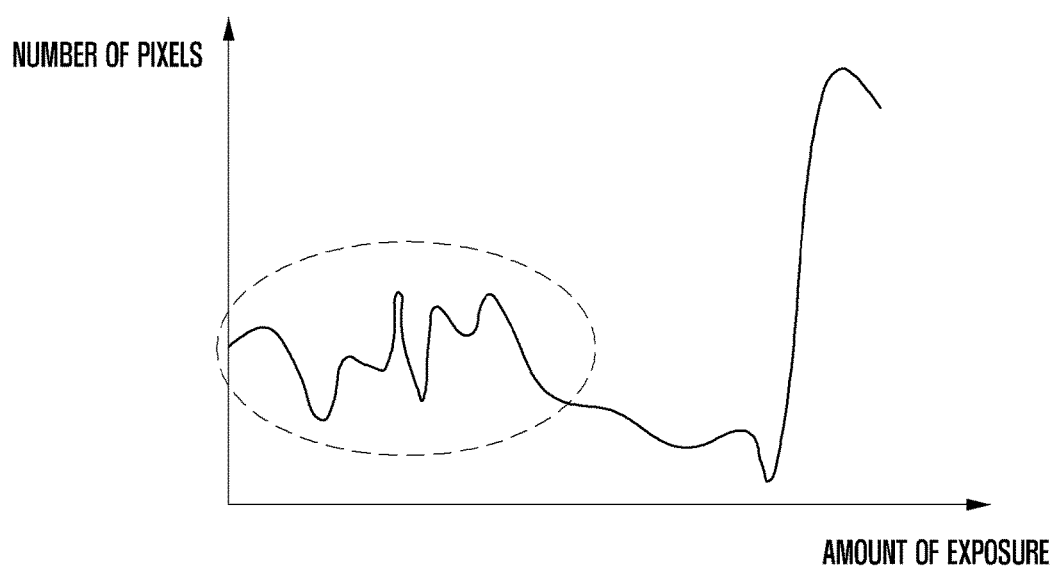
Figure 5D:
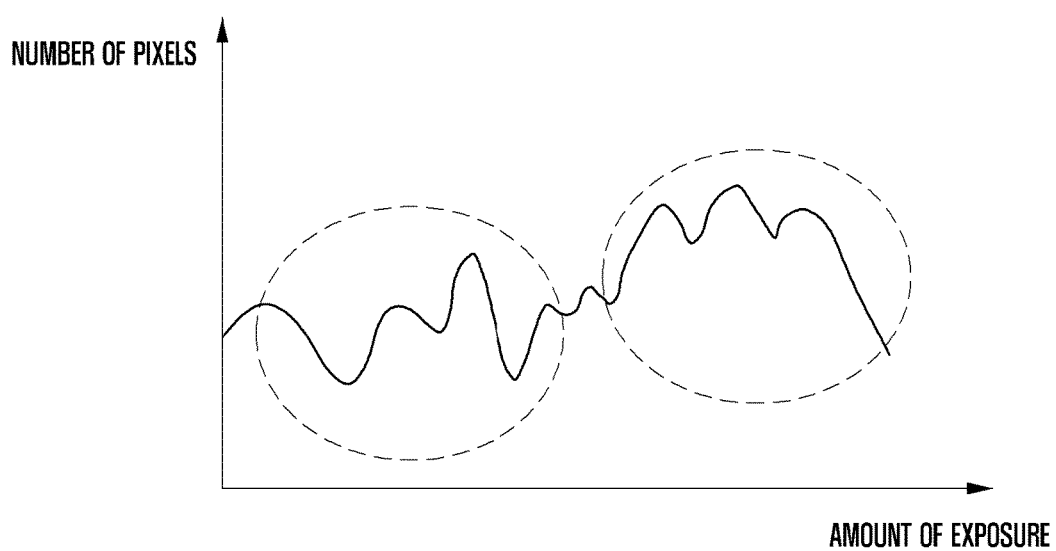

Similarly, when an image contains an underexposed region, the electronic device 200 may increase the exposure time of at least one of long exposure pixels of the image sensor corresponding to the underexposed region of the image to obtain an image with less underexposure. Although the brightness histogram shown in FIG. 5A shows a large number of pixels in the underexposed region, by increasing the exposure time of at least one of long exposure pixels of the image sensor, the electronic device 200 may acquire an image with less underexposure as shown by the brightness histogram of FIG. 5C.

Here, decreasing the exposure time of a short exposure pixel may indicate that the exposure time of a short exposure pixel is set shorter than that in normal AE mode. Increasing the exposure time of a long exposure pixel may indicate that the exposure time of a long exposure pixel is set longer than that in normal AE mode.

In addition, the electronic device 200 may combine a less-underexposed image and a less-overexposed image. As indicated by the brightness histogram of FIG. 5A, the acquired image contains both an underexposed region and an overexposed region. In this case, the electronic device 200 may combine an image with less underexposure and an image with less overexposure to produce an improved image as indicated by the brightness histogram shown in FIG. 5D.

In one embodiment, in addition to an image acquired through at least one short exposure pixel (e.g. first image) and an image acquired through at least one long exposure pixel (e.g. second image), the electronic device 200 may further acquire at least one image (e.g. third image) in HDR mode.

The third image is an image acquired during second exposure of the short exposure pixel made in time between the end of first exposure of the short exposure pixel and the end of exposure of the long exposure pixel, and the third image may be used for HDR mode operation.

The third image may have a brightness histogram similar to that of the image acquired in normal AE mode, and it may have an exposure time between the exposure time of normal AE mode and the first exposure time of the short exposure pixel or between the exposure time of normal AE mode and the exposure time of the long exposure pixel. The electronic device 200 may adjust the exposure time of at least one pixel of the image sensor to thereby operate in HDR mode.

Figure 3B:
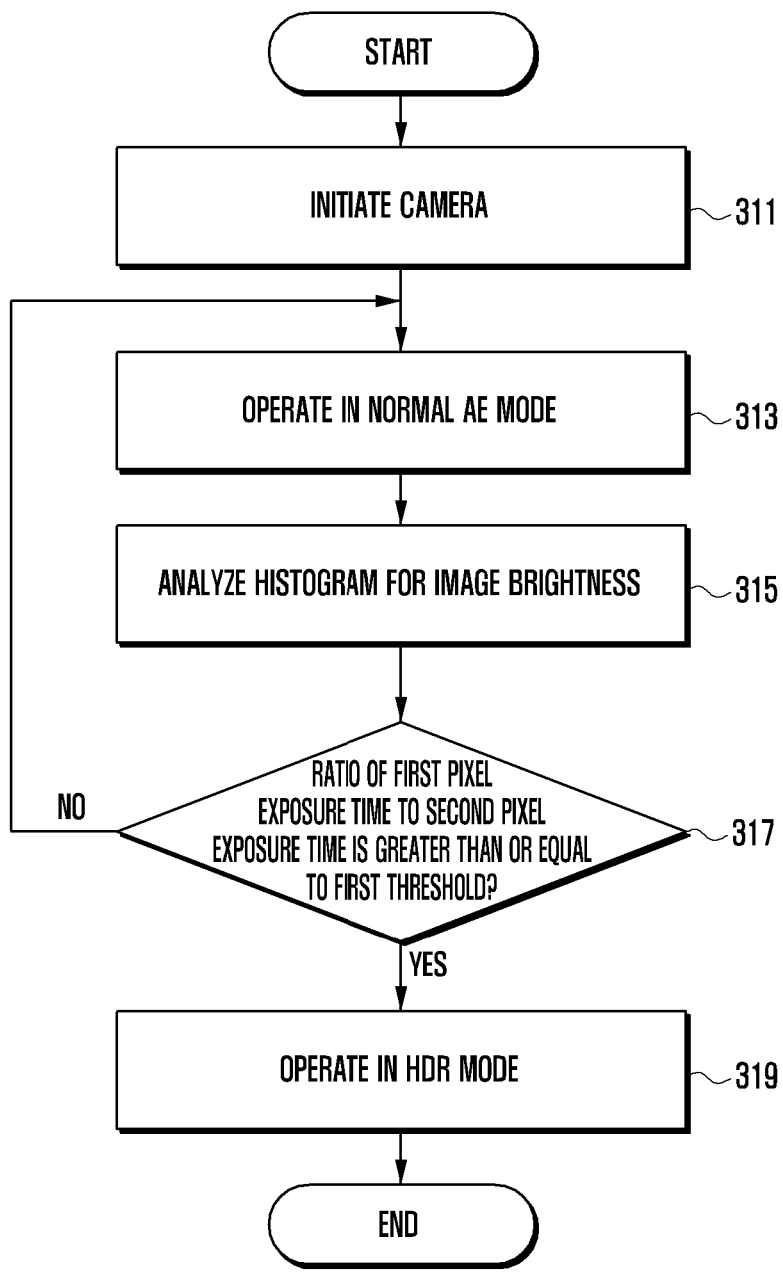
FIG. 3B is a flowchart for invoking HDR mode in the electronic device according to various embodiments of the present invention.

FIG. 3B is a flowchart for invoking HDR mode in the electronic device according to various embodiments of the present invention.

At operation 311, the electronic device 200 may initiate the camera function. Operation 311 may be identical to operation 301 in FIG. 3A. At operation 313, the electronic device 200 may operate in normal AE mode. Operation 313 may be identical to operation 303 in FIG. 3A. At operation 315, the electronic device 200 may analyze the brightness histogram for an image. Operation 315 may be identical to operation 305 in FIG. 3A.

At operation 317, the electronic device 200 may determine whether the ratio of the first pixel exposure time to the second pixel exposure time is greater than or equal to a first threshold. Here, the first pixel may be a long exposure pixel and the second pixel may be a short exposure pixel. For example, if the exposure time of the long exposure pixel versus the exposure time of the short exposure pixel is 1:1 or 2:1, as the image is acquired through proper exposure, underexposure and overexposure generally do not occur at the same time in the image. When the ratio of the exposure time of the long exposure pixel to the exposure time of the short exposure pixel is less than or equal to a given value (first threshold), as the image is acquired through proper exposure, underexposure and overexposure may not generally occur at the same time in the image.

In one embodiment, when the time difference between the exposure time of the long exposure pixel and the exposure time of the short exposure pixel is less than a given time value, as the image is acquired through proper exposure, underexposure and overexposure may not generally occur at the same time in the image.

Upon determining that the ratio of the exposure time of the long exposure pixel to the exposure time of the short exposure pixel for an image acquired in normal AE mode is less than or equal to the given value (first threshold), the procedure returns to operation 313 at which the electronic device 200 may continue to operate in normal AE mode.

Upon determining that the ratio of the exposure time of the long exposure pixel to the exposure time of the short exposure pixel for an image acquired in normal AE mode is greater than or equal to the given value (first threshold), the procedure proceeds to operation 319, at which the electronic device 200 may operate in HDR mode.

If the ratio of the exposure time of the long exposure pixel to the exposure time of the short exposure pixel is greater than or equal to the given value (first threshold), it can be seen that underexposure and overexposure have occurred simultaneously in the acquired image.

In one embodiment, when the time difference between the exposure time of the long exposure pixel and the exposure time of the short exposure pixel is greater than a given time value, it can be seen that underexposure and overexposure have occurred simultaneously in the image.

In HDR mode, the electronic device 200 may acquire an HDR image in the following way.

In one embodiment, pixels of an image may correspond to pixels of the image sensor. Accordingly, when an image contains an overexposed region, the electronic device 200 may decrease the exposure time of at least one of short exposure pixels of the image sensor corresponding to the overexposed region of the image to obtain an image with less overexposure. Although the brightness histogram of FIG. 5A for an image obtained in normal AE mode shows a large number of pixels in the overexposed region, by decreasing the exposure time of at least one of short exposure pixels of the image sensor, the electronic device 200 may acquire an image with less overexposure as shown by the brightness histogram of FIG. 5B.

Similarly, when an image contains an underexposed region, the electronic device 200 may increase the exposure time of at least one of long exposure pixels of the image sensor corresponding to the underexposed region of the image to obtain an image with less underexposure. Although the brightness histogram of FIG. 5A shows a large number of pixels in the underexposed region, by increasing the exposure time of at least one of long exposure pixels of the image sensor, the electronic device 200 may acquire an image with less underexposure as shown by the brightness histogram of FIG. 5C.

Here, decreasing the exposure time of a short exposure pixel may indicate that the exposure time of a short exposure pixel is set shorter than that in normal AE mode. Increasing the exposure time of a long exposure pixel may indicate that the exposure time of a long exposure pixel is set longer than that in normal AE mode.

In addition, the electronic device 200 may combine a less-underexposed image and a less-overexposed image. As indicated by the brightness histogram of FIG. 5A, the acquired image contains both an underexposed region and an overexposed region. In this case, the electronic device 200 may combine an image with less underexposure and an image with less overexposure to produce an improved image as indicated by the brightness histogram shown in FIG. 5D.

In one embodiment, in addition to an image acquired through at least one short exposure pixel (e.g. first image) and an image acquired through at least one long exposure pixel (e.g. second image), the electronic device 200 may further acquire at least one image (e.g. third image) in HDR mode.

The third image is an image acquired during second exposure of the short exposure pixel made in time between the end of first exposure of the short exposure pixel and the end of exposure of the long exposure pixel, and the third image may be used for HDR mode operation.

The third image may have a brightness histogram similar to that of the image acquired in normal AE mode, and it may have an exposure time between the exposure time of normal AE mode and the first exposure time of the short exposure pixel or between the exposure time of normal AE mode and the exposure time of the long exposure pixel. The electronic device 200 may adjust the exposure time of at least one pixel of the image sensor to thereby operate in HDR mode.

Figure 3C:
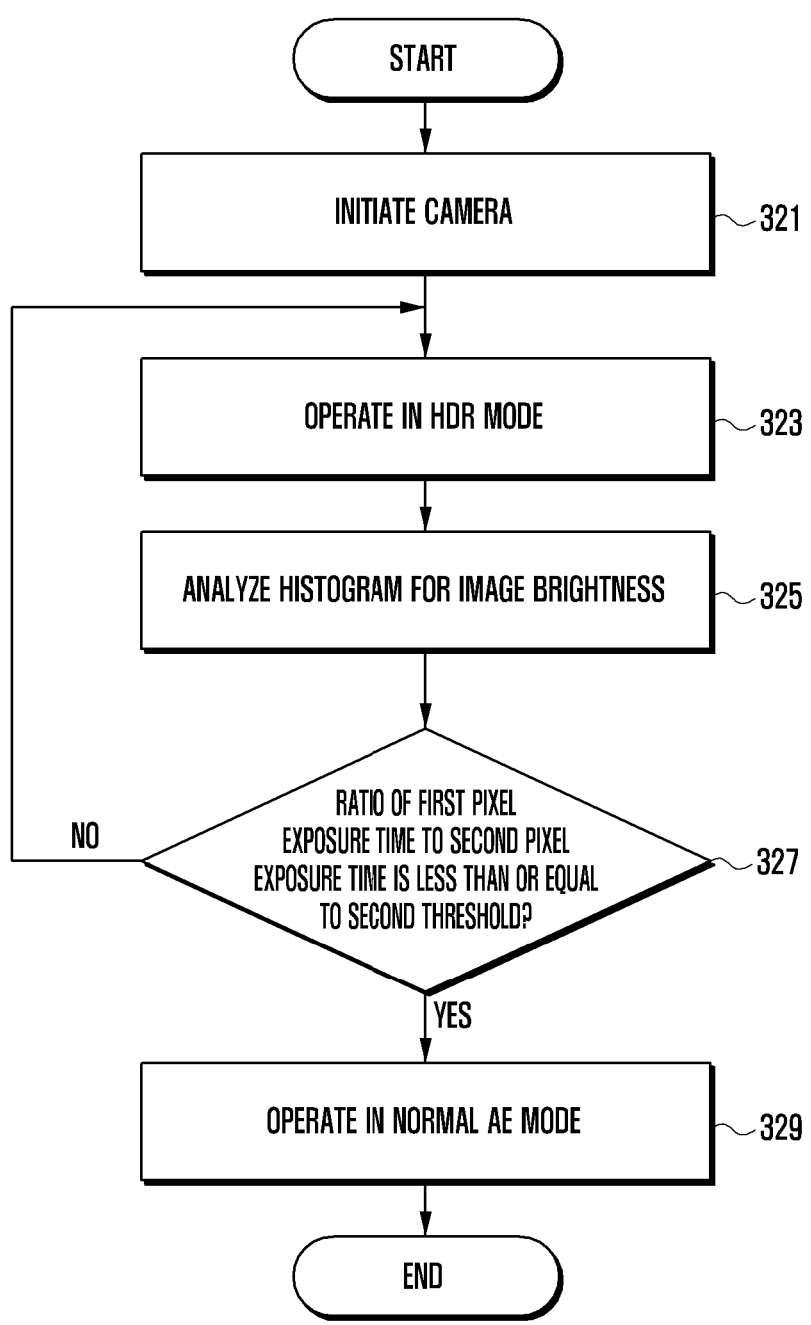
FIG. 3C is a flowchart for invoking normal AE mode in the electronic device according to various embodiments of the present invention.

FIG. 3C is a flowchart for invoking normal AE mode in the electronic device 200 according to various embodiments of the present invention.

At operation 321, the electronic device 200 may initiate the camera function. Operation 321 may be identical to operation 301 in FIG. 3A. At operation 323, the electronic device 200 may operate in HDR mode.

At operation 325, the electronic device 200 may analyze the brightness histogram for an image. Operation 325 may be identical to operation 305 in FIG. 3A or operation 315 in FIG. 3B.

At operation 327, the electronic device 200 may determine whether the ratio of the first pixel exposure time to the second pixel exposure time is less than or equal to the first threshold. Here, the first pixel may be a long exposure pixel and the second pixel may be a short exposure pixel.

For example, if the exposure time of the long exposure pixel versus the exposure time of the short exposure pixel is 1:1 or 2:1, as the image is acquired through proper exposure, underexposure or overexposure generally does not occur in the image. When the ratio of the exposure time of the long exposure pixel to the exposure time of the short exposure pixel is less than or equal to a given value (first threshold), as the image is acquired through proper exposure, underexposure or overexposure may not generally occur in the image.

In one embodiment, when the time difference between the exposure time of the long exposure pixel and the exposure time of the short exposure pixel is less than a given time value, as the image is acquired through proper exposure, underexposure and overexposure may not generally occur at the same time in the image.

Upon determining that the ratio of the exposure time of the long exposure pixel to the exposure time of the short exposure pixel for an image acquired in normal AE mode is less than or equal to the given value (first threshold), the procedure proceeds to operation 329 at which the electronic device 200 may operate in normal AE mode.

If the ratio of the exposure time of the long exposure pixel to the exposure time of the short exposure pixel is greater than or equal to the given value (first threshold), it can be seen that underexposure and overexposure have occurred simultaneously in the acquired image.

In one embodiment, when the time difference between the exposure time of the long exposure pixel and the exposure time of the short exposure pixel is greater than a given time value, it can be seen that underexposure and overexposure have occurred simultaneously in the image.

Upon determining that the ratio of the exposure time of the long exposure pixel to the exposure time of the short exposure pixel for an image acquired in normal AE mode is greater than or equal to the given value (first threshold), the procedure returns to operation 323, at which the electronic device 200 may operate in HDR mode.

Figure 4:
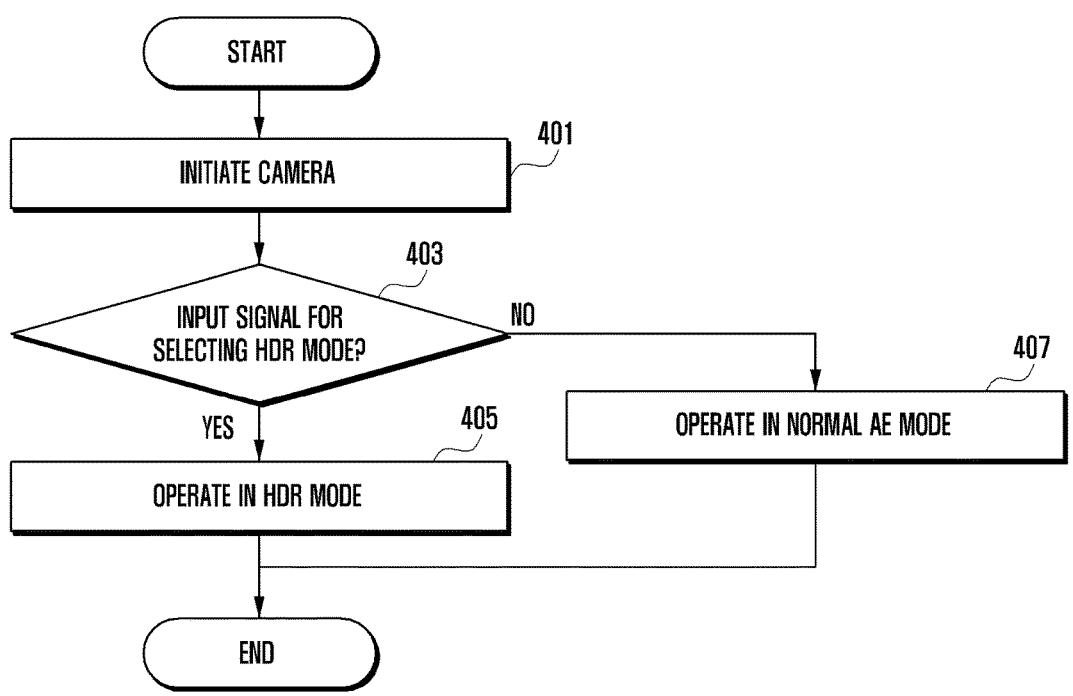
FIG. 4 is a flowchart for invoking HDR mode in the electronic device according to various embodiments of the present invention.

FIG. 4 is a flowchart for invoking HDR mode and normal AE mode in the electronic device 200 according to various embodiments of the present invention.

At operation 401, the electronic device 200 may initiate the camera function. When the camera function is initiated, the electronic device 200 may receive light through the lens. The received light reaches the image sensor, and the image sensor can detect the photon and convert it into an electrical signal. The sensed light may be converted into digital information such as brightness, color, and coordinates depending upon the intensity and position. Here, the image sensor may be a photoelectric conversion device in the form of an integrated circuit fabricated using manufacturing techniques for semiconductor devices.

At operation 403, the electronic device 200 may receive a user input signal for selecting HDR mode. A user input signal generated by a touch on the touchscreen, input key, or button may be sent to the electronic device 200. To receive a user input signal for selecting HDR mode, the electronic device 200 may output a user interface or menu for HDR mode selection on the display 260.

Upon receiving a user input signal for selecting HDR mode, at operation 405, the electronic device 200 may operate in HDR mode.

Upon not receiving a user input signal for selecting HDR mode, at operation 407, the electronic device 200 may operate in normal AE mode.

II. Image Processing Apparatus and Image Sensor Arrangement

Figure 6:
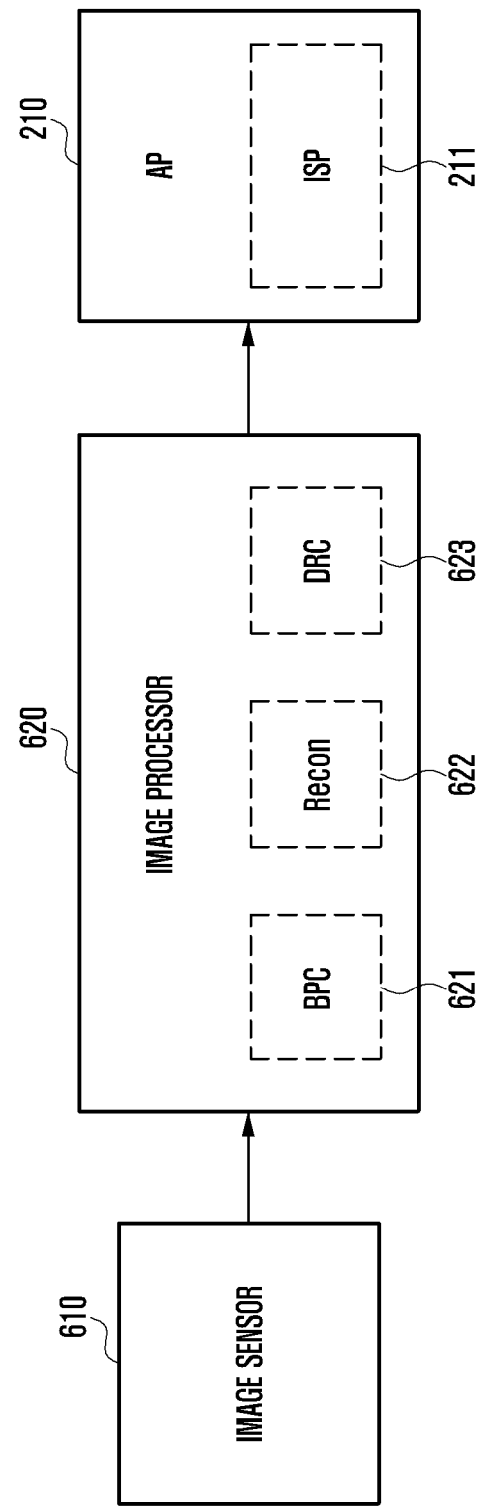
FIG. 6 is a block diagram of an image processing apparatus according to various embodiments of the present invention.

FIG. 6 is a block diagram of an image processing apparatus according to various embodiments of the present invention.

In various embodiments, the image processing apparatus may include an image sensor 610, an image processor 620, and the AP 210.

The image sensor 610 may detect photons and convert the same into an electrical signal. The sensed light may be converted into digital information such as brightness, color, and coordinates depending upon the intensity and position, producing raw data. The image sensor 610 may send the raw data to the image sensor 610.

The image sensor 610 may include one or more long exposure pixels and one or more short exposure pixels. In the image sensor 610, long exposure pixels and short exposure pixels may be arranged in a regular or irregular form so as to prevent highlight loss or shadow loss in the target object.

The image processor 620 may include at least one of a bad pixel corrector (BPC) 621, a reconstructor (Recon) 622, and a dynamic range compressor (DRC) 623.

The image processor 620 may process an image in raw data form and send the processed image to the AP 210.

The BPC 621 may analyze a raw data image from the image sensor 610 to find and correct a bad pixel. The Recon 622 may reconstruct a raw data image. The DRC 623 may compress the dynamic range of an image.

While operating in normal AE mode, the electronic device 200 may not drive at least one of the Recon 622 and the DRC 623. While operating in HDR mode, the electronic device 200 may drive at least one of the Recon 622 and the DRC 623.

The AP 210 receives an image processed by the image processor 620 and can apply additional image processing operations to the received image. In one embodiment, the AP 210 may further include an image signal processor (ISP) 211.

In one embodiment, the image sensor 610, the image processor 620, and the ISP 211 may be included in the camera module 291. In one embodiment, the image sensor 610 may be included in the camera module 291, and the image processor 620 and the ISP 211 may be included in the AP 210. In one embodiment, the function of the image processor 620 may be performed by the ISP 211.

FIGS. 7A to 7I illustrate patterns of pixels in the image sensor 610 according to various embodiments of the present invention.

Figure 7A:
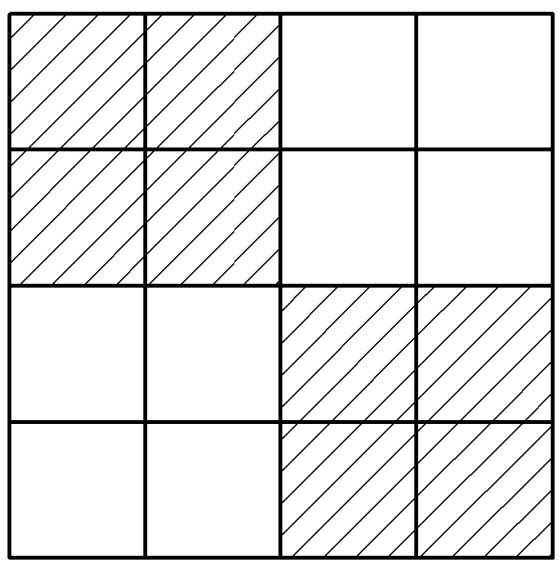
FIGS. 7A to 7I illustrate patterns of pixels in an image sensor according to various embodiments of the present invention.
Figure 7A:
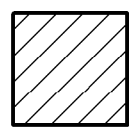
Figure 7A:
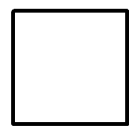

Referring to FIG. 7A, when the image sensor 610 including image pixels is divided into four sections in a cross shape, long exposure pixels 710 may be arranged in upper-left and lower-right sections and short exposure pixels 720 may be arranged in lower-left and upper-right sections. In FIG. 7A, when the image sensor 610 including image pixels is divided into four sections in a cross shape, long exposure pixels 710 may be arranged in one section and short exposure pixels 720 may be arranged in another section.

Figure 7B:
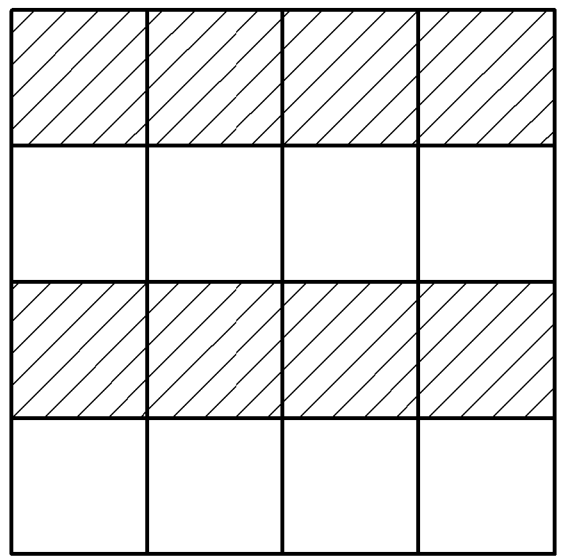
Figure 7B:
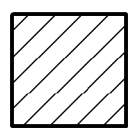
Figure 7B:
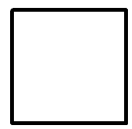
Figure 7C:
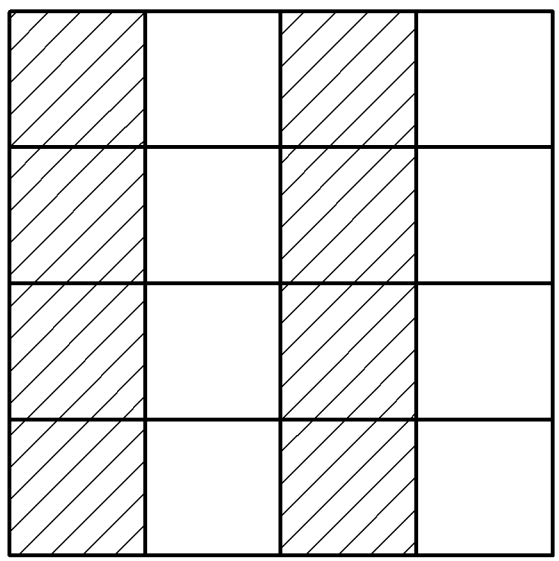
Figure 7C:
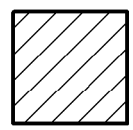
Figure 7C:
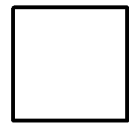
Figure 7D:
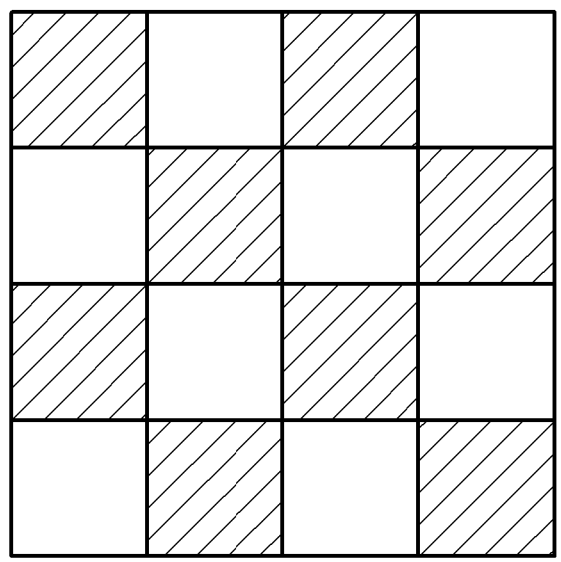
Figure 7D:
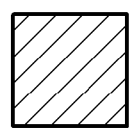
Figure 7D:
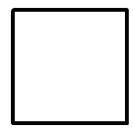
Figure 7E:
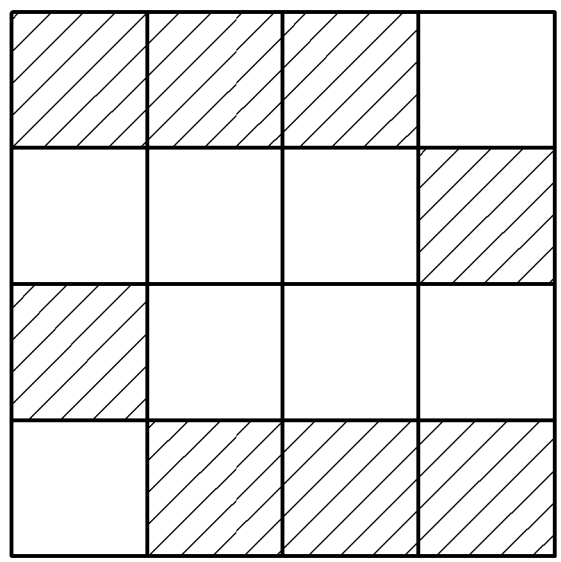
Figure 7E:
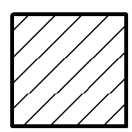
Figure 7E:
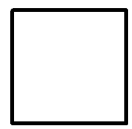
Figure 7F:
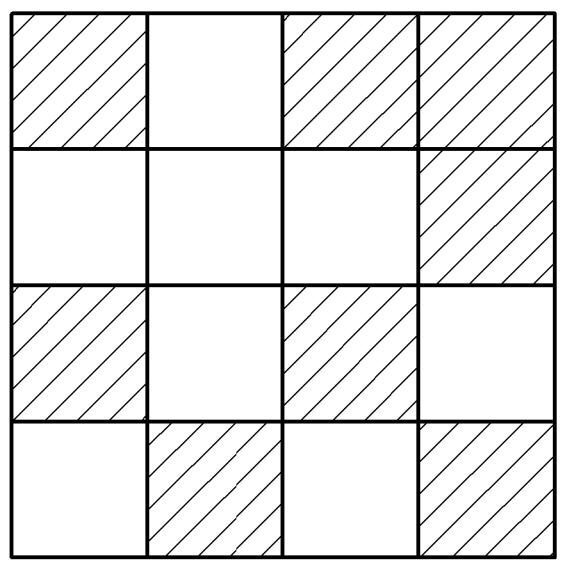
Figure 7F:
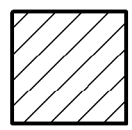
Figure 7F:
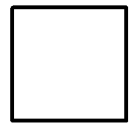
Figure 7G:
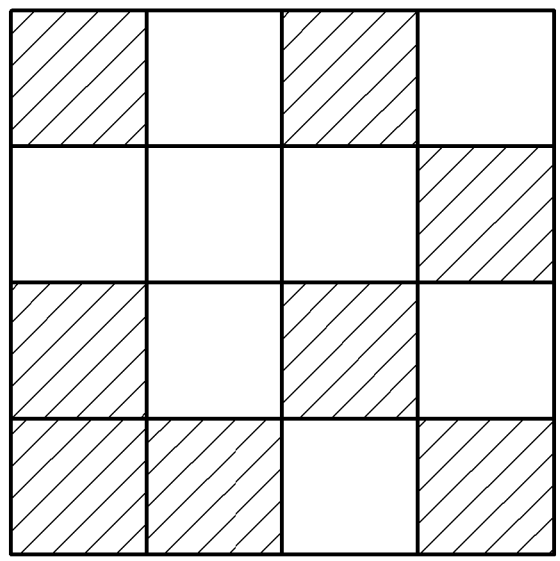
Figure 7G:
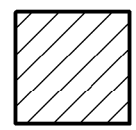
Figure 7G:
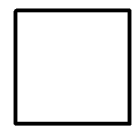
Figure 7H:
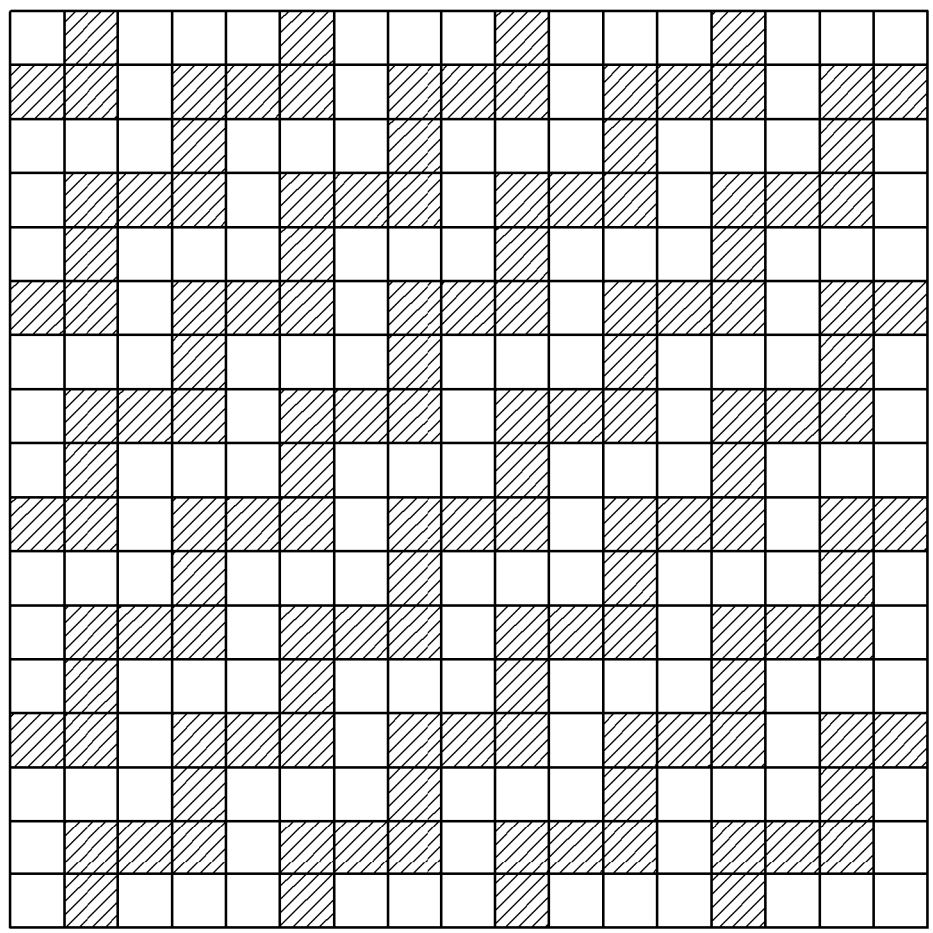
Figure 7H:
Figure 7H:
Figure 7I:
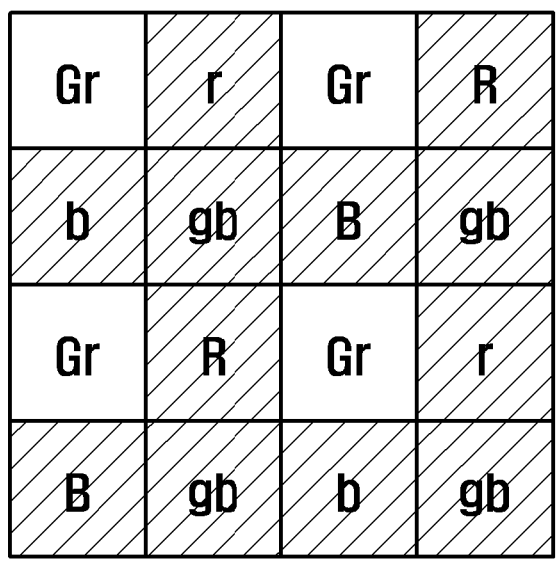
Figure 7I:
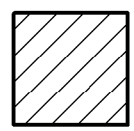
Figure 7I:

As shown in FIG. 7B, in the image sensor 610, long exposure pixels 710 and short exposure pixels 720 may be arranged alternately row by row. As shown in FIG. 7C, in the image sensor 610, long exposure pixels 710 and short exposure pixels 720 may be arranged alternately column by column. As shown in FIG. 7D, in the image sensor 610, long exposure pixels 710 and short exposure pixels 720 may be alternately arranged in a chess pattern. As shown in FIG. 7E, in the image sensor 610, long exposure pixels 710 and short exposure pixels 720 may be arranged in a given pattern. As shown in FIGS. 7F and 7G, in the image sensor 610, long exposure pixels 710 and short exposure pixels 720 may be arranged in an irregular pattern. As shown in FIG. 7H, in the image sensor 610, long exposure pixels 710 and short exposure pixels 720 may be alternately arranged in a stepped pattern. As shown in FIG. 7I, in the image sensor 610, long exposure pixels 710 may be arranged as color pixels and short exposure pixels 720 may be arranged as grey pixels.

For example, as described before, the HDR functionality may be achieved by dividing the pixels 710 and 720 of the image sensor 610 into at least two pixel groups with different exposure amounts and separately arranging the pixel groups. In the description of various embodiments, the phrase "different exposure amounts (settings)" may indicate that the exposure time for long exposure pixels 710 is different from that for short exposure pixels 720. For different exposure settings, in one embodiment, the exposure for short exposure pixels 710 and the exposure for long exposure pixels 720 may be made at the same time. On the other hand, the exposure of long exposure pixels 710 need not be made simultaneously with the exposure of short exposure pixels 720. For different exposure settings, in another embodiment, the photoelectric conversion efficiency of long exposure pixels 710 may be set differently from that of short exposure pixels 720. For different exposure settings, in another embodiment, aperture settings for long exposure pixels 710 may be set differently from those for short exposure pixels 720. For different exposure settings, in another embodiment, the size of long exposure pixels 710 may be set differently from that of short exposure pixels 720. It is also possible to change the amount of light incident to the pixel per unit time through lens or filter adjustment.

In various embodiments, the image sensor 610 may include phase difference detection pixels (not shown) in addition to long exposure pixels 710 and short exposure pixels 720. The electronic device 200 may further include color filters corresponding to individual pixels.

Figure 7J:
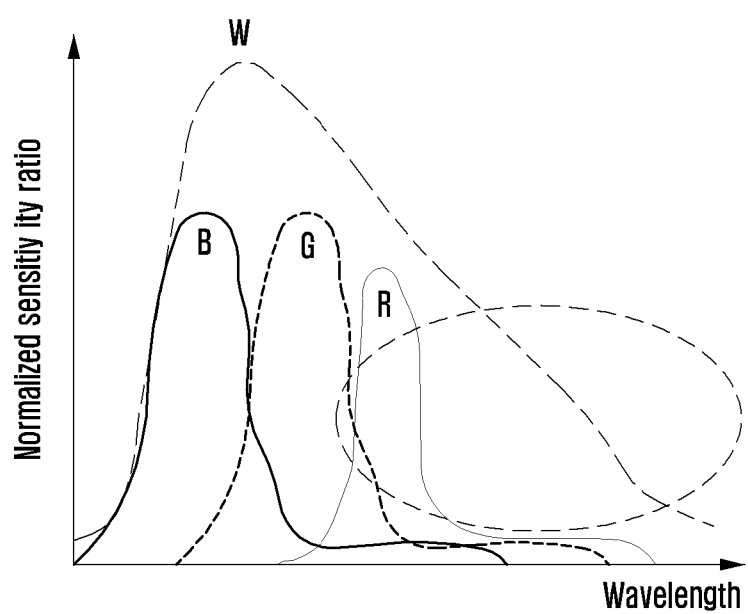
FIG. 7J shows a graph of the exposure ratio versus wavelength according to various embodiments of the present invention.

FIG. 7J shows a graph of the exposure ratio versus wavelength according to various embodiments of the present invention. A description is given below of color filters with reference to FIG. 7J.

The color filters may include, for example, a white light filter W, a red light filter R, a green light filter G, a blue filter B, and a filter that transmits or blocks other color light. The color filters may have different transmittances depending upon the wavelength of the incident light. In one embodiment, the white light filter W may have a higher exposure ratio compared with the red light filter R, the green light filter G, and the blue light filter B; and the red light filter R, the green light filter G and the blue light filter B may have similar exposure ratios. Hence, the pixels arranged corresponding to the white light filter W may have a higher exposure amount than the other pixels during the same exposure time. For a phase difference detection pixel (not shown), to compensate for the insufficient amount of received light, the phase difference detection pixel may be arranged to have a white light filter W.

In one embodiment, low-efficiency pixels used for focus detection may be some of those pixels arranged with a red light filter R, green light filter G, and blue light filter B. Pixels arranged with a red light filter R, green light filter G, and blue light filter B may have a longer exposure time compared with pixels arranged with a white light filter W. Hence, when color filters are arranged, some of pixels having low light receiving efficiency may be configured as focus detection pixels according to the properties of individual color filters without arrangement of low-efficiency pixels having a phase separation structure.

III. Acquisition of Improved HDR Image

Figure 8:
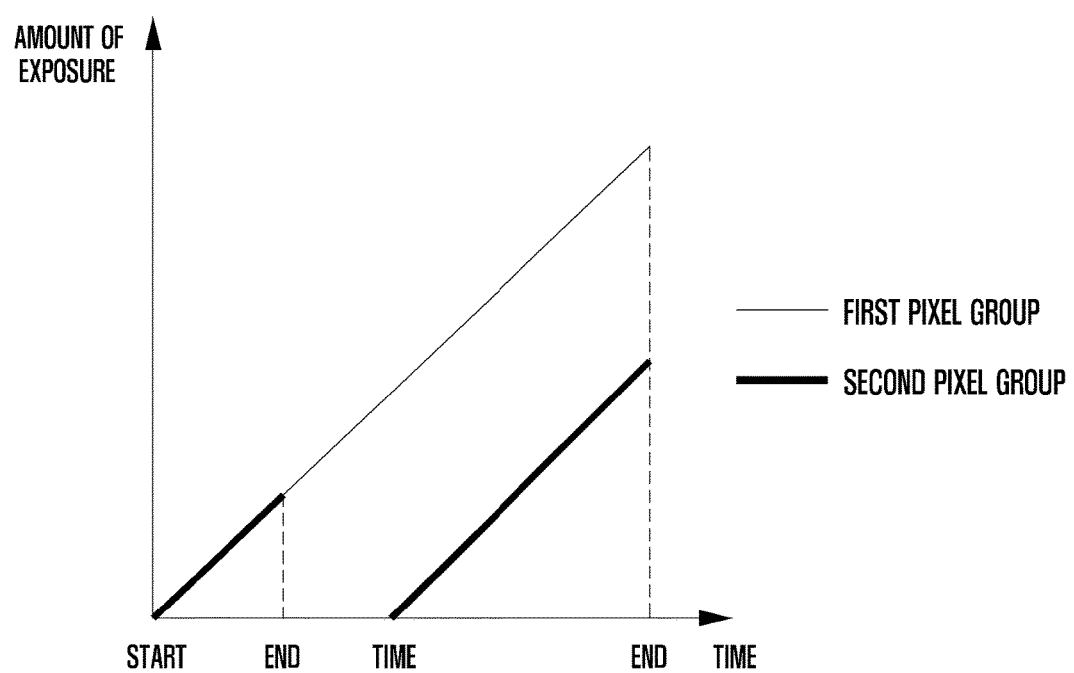
FIG. 8 shows a graph of the amount of exposure with time for first and second pixel groups according to various embodiments of the present invention.

FIG. 8 shows a graph of the amount of exposure with time for first and second pixel groups in the electronic device 200 according to various embodiments of the present invention.

The first pixel may be a long exposure pixel, and the second pixel may be a short exposure pixel.

In the image sensor 610 according to various embodiments, the exposure of the first group pixels 710 and the exposure of the second group pixels 720 may start at the same time. Thereafter, the exposure of the second group pixels 720 may end first, data of the second group pixels 720 whose exposure is ended may be stored, the second group pixels 720 may be reset, and the exposure of the second group pixels 720 may start again.

As the exposure time of the first group pixels 710 is significantly longer than that of the second group pixels 720, the first exposure of the second group pixels 720 may end, data of the second group pixels 720 may be stored, the second group pixels 720 may be reset, and the second exposure of the second group pixels 720 may start and then end at the same time as the exposure of the first group pixels 710 ends. The second exposure of the second group pixels 720 may be longer than the first exposure thereof and may be shorter than the exposure of the first group pixels 710. In addition, although not shown, the exposure of the second group pixels 720 may start after the exposure of the first group pixels 710 starts, and it may end before the exposure of the first group pixels 710 ends.

Figure 9A:
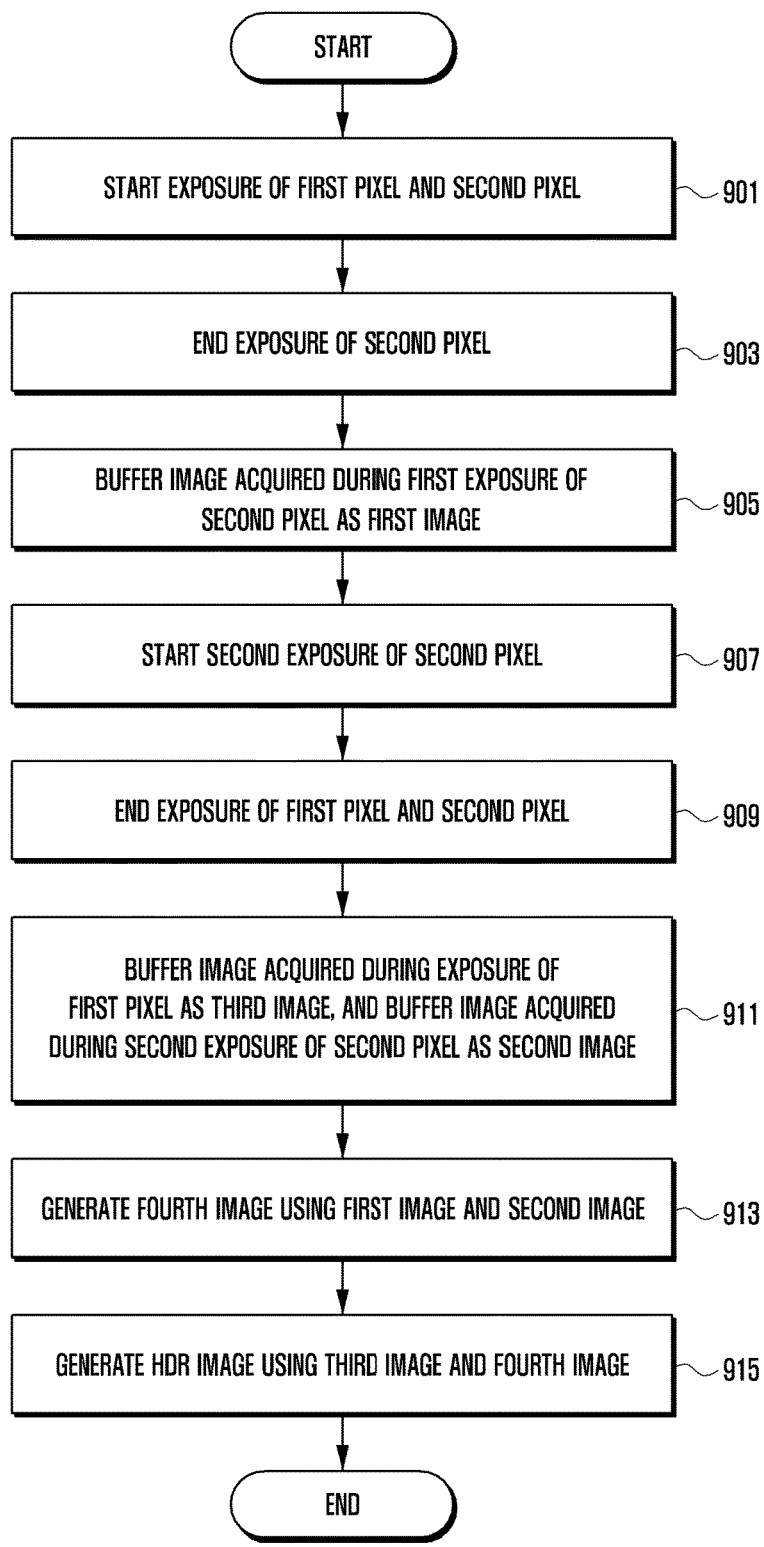
Figure 9B:
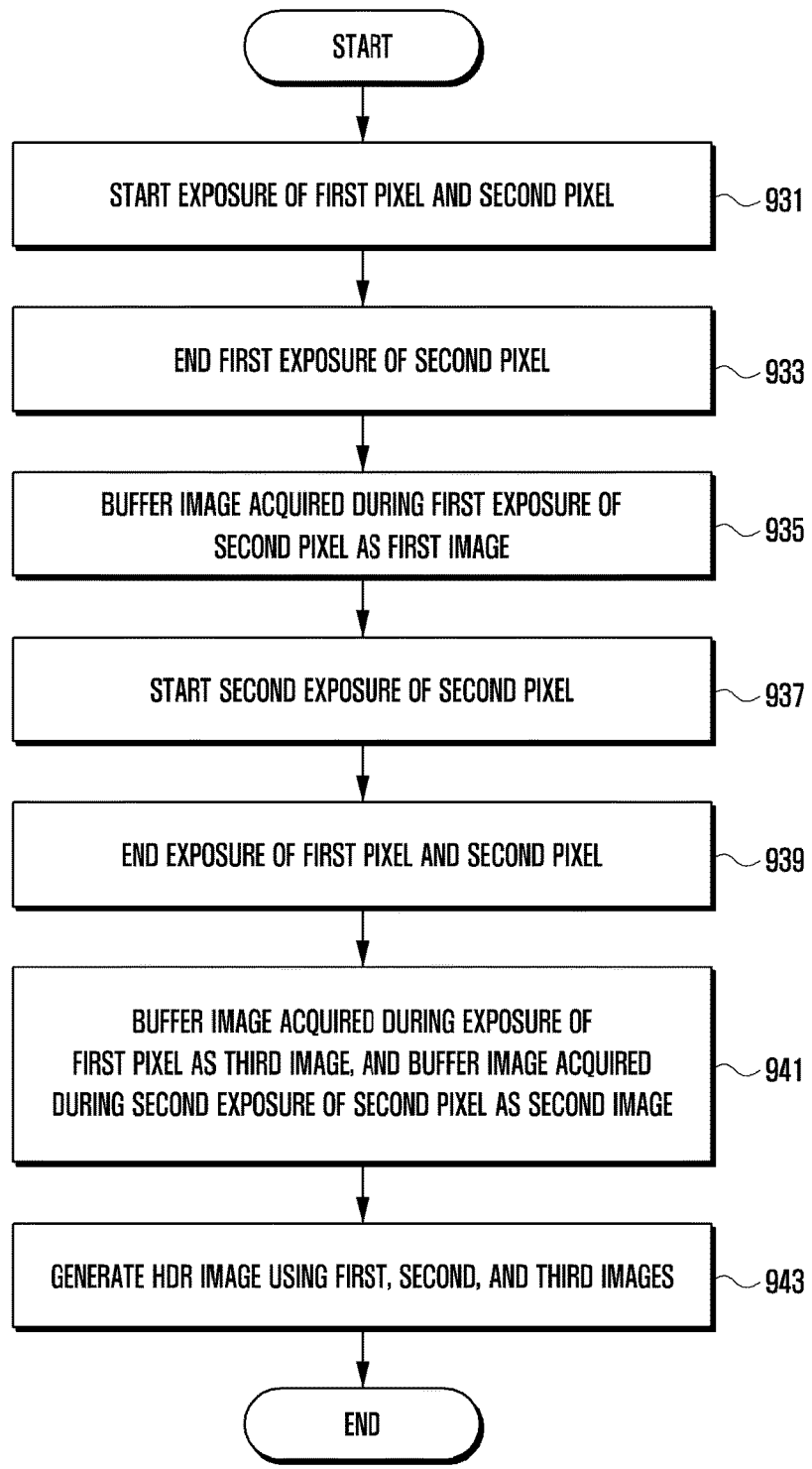

FIGS. 9A to 9C are flowcharts of schemes for HDR image acquisition in the electronic device 200 according to various embodiments of the present invention.

Referring to FIG. 9A, at operation 901, the electronic device 200 may start the exposure of the first pixel group and the second pixel group in the image sensor 610.

The first pixel group may include one or more long exposure pixels, and the second pixel group may include one or more short exposure pixels.

At operation 903, the electronic device 200 may end the first exposure of the second pixel group of the image sensor 610. At operation 905, the electronic device 200 may store the image acquired during the first exposure of the second pixel group in a buffer as a first image.

At operation 907, the electronic device 200 may start the second exposure of the second pixel group of the image sensor 610. Here, the second exposure of the second pixel group may be longer than the first exposure thereof and may be shorter than the exposure of the first pixel group.

At operation 909, the electronic device 200 may end the exposure of the first pixel group of the image sensor 610 and end the second exposure of the second pixel group.

At operation 911, the electronic device 200 may store the image acquired during the exposure of the first pixel group in the buffer as a third image, and it may store the image acquired during the second exposure of the second pixel group in the buffer as a second image. Here, the second exposure of the second pixel group may be longer than the first exposure thereof and may be shorter than the exposure of the first pixel group. The sum of the first exposure time and the second exposure time of the second pixel group may be shorter than or equal to the exposure time of the first pixel group.

At operation 913, the electronic device 200 may generate a fourth image by using the first image and the second image stored in the buffer through the AP 210 or image processing apparatus. In one embodiment, the electronic device 200 may control the AP 210 or image processing apparatus to generate the fourth image by applying interpolation to the first image and the second image stored in the buffer. In another embodiment, the electronic device 200 may control the AP 210 or image processing apparatus to generate the fourth image by combining the first image and the second image stored in the buffer.

At operation 915, the electronic device 200 may control the AP 210 or image processing apparatus to generate an HDR image by using the third image and the fourth image. In one embodiment, the electronic device 200 may control the AP 210 or image processing apparatus to generate the HDR image by applying interpolation to the third image and the fourth image. In another embodiment, the electronic device 200 may control the AP 210 or image processing apparatus to generate the HDR image by combining the third image and the fourth image.

Referring to FIG. 9B, at operation 931, the electronic device 200 may control the image sensor 610 to start the exposure of the first pixel group and the second pixel group.

The first pixel group may include one or more long exposure pixels, and the second pixel group may include one or more short exposure pixels.

At operation 933, the electronic device 200 may end the first exposure of the second pixel group of the image sensor 610. At operation 905, the electronic device 200 may store the image acquired during the first exposure of the second pixel group in a buffer as a first image.

At operation 937, the electronic device 200 may start the second exposure of the second pixel group of the image sensor 610. Here, the second exposure of the second pixel group may be longer than the first exposure thereof and may be shorter than the exposure of the first pixel group. The sum of the first exposure time and the second exposure time of the second pixel group may be shorter than or equal to the exposure time of the first pixel group.

At operation 939, the electronic device 200 may end the exposure of the first pixel group of the image sensor 610 and may end the second exposure of the second pixel group.

At operation 941, the electronic device 200 may store the image acquired during the exposure of the first pixel group in the buffer as a third image, and it may store the image acquired during the second exposure of the second pixel group in the buffer as a second image.

At operation 943, the electronic device 200 may control the AP 210 or image processing apparatus to generate an HDR image by using the first to third images. In one embodiment, the electronic device 200 may control the AP 210 or image processing apparatus to generate the HDR image by applying interpolation to the first to third images. In another embodiment, the electronic device 200 may control the AP 210 or image processing apparatus to generate the HDR image by combining the first to third images.

Referring to FIG. 9C, at operation 951, the electronic device 200 may start the exposure of the first pixel group and the second pixel group in the image sensor 610.

The first pixel group may include one or more long exposure pixels, and the second pixel group may include one or more short exposure pixels.

At operation 953, the electronic device 200 may end the first exposure of the second pixel group of the image sensor 610. At operation 955, the electronic device 200 may store the image acquired during the first exposure of the second pixel group in a buffer as a first image.

At operation 957, the electronic device 200 may start the second exposure of the second pixel group of the image sensor 610. Here, the second exposure time of the second pixel group may be longer than the first exposure time thereof and may be shorter than the exposure time of the first pixel group. The sum of the first exposure time and the second exposure time of the second pixel group may be shorter than or equal to the exposure time of the first pixel group.

At operation 959, the electronic device 200 may end the second exposure of the second pixel group of the image sensor 610.

At operation 961, the electronic device 200 may store the image acquired during the second exposure of the second pixel group in the buffer as a second image.

At operation 963, the electronic device 200 may generate a third image by using the first image and the second image through the AP 210 or image processing apparatus. In one embodiment, the electronic device 200 may control the AP 210 or image processing apparatus to generate the third image by applying interpolation to the first image and the second image. In another embodiment, the electronic device 200 may control the AP 210 or image processing apparatus to generate the third image by combining the first image and the second image.

At operation 965, the electronic device 200 may end the exposure of the first pixel group of the image sensor 610. At operation 967, the electronic device 200 may store the image acquired during the exposure of the first pixel group of the image sensor 610 in the buffer as a fourth image.

At operation 969, the electronic device 200 may control the AP 210 or image processing apparatus to generate an HDR image by using the third image and the fourth image. Here, the electronic device 200 may control the AP 210 or image processing apparatus to generate the HDR image by applying interpolation to the third image and the fourth image. The electronic device 200 may control the AP 210 or image processing apparatus to generate the HDR image by combining the third image and the fourth image.

Figure 10A:
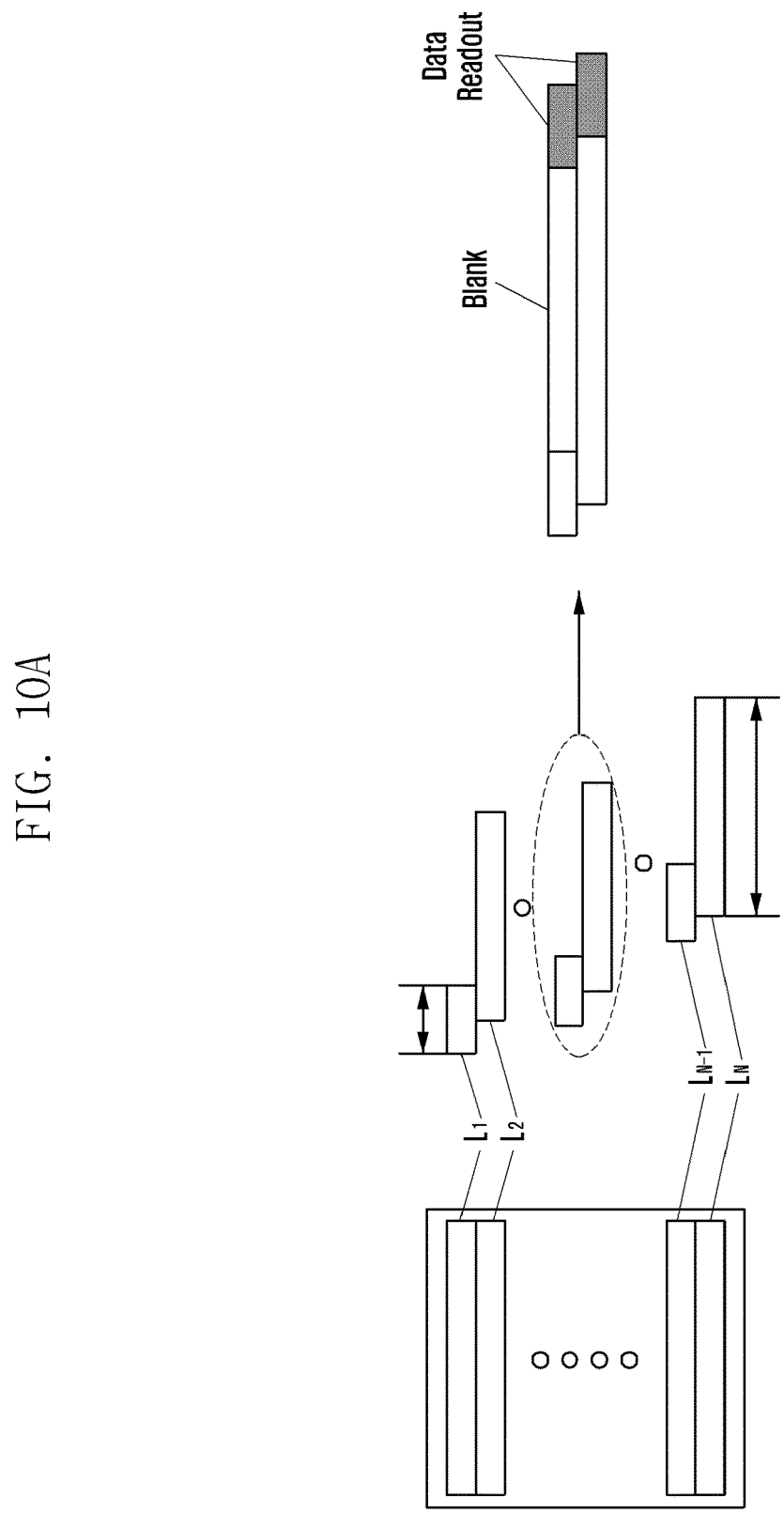

FIGS. 10A and 10B illustrate timings for exposure and data readout of the image sensor 1001 in the electronic device 200 according to various embodiments of the present invention. In one embodiment, the electronic device 200 may capture the image in a rolling shutter fashion. In the electronic device 200 using a rolling shutter scheme, data is read out line by line (L1~LN).

FIG. 10A illustrates a case where the exposure is different on a line-by-line basis like a coded rolling shutter. In a case where the 1st column (L1) and the N-1th column (LN-1) have the same exposure timing, the 2nd column (L2) and the Nth column (LN) have the same exposure timing, and the 1st column (L1) and the 2nd column (L2) have different exposure timings (e.g. the 1st column (L1) has an exposure timing of $1/32$ sec and the 2nd column (L2) has an exposure timing of $1/4$ sec), the 1st column (L1) may receive light for $1/32$ sec at a first pixel 1002 of the image sensor 1001, be reset, and may not store a received signal after expiration of the exposure timing. The 1st column (L1) may not store a received signal from the end of the exposure timing to the end of the exposure timing of $1/4$ sec of the 2nd column (L2), and data may be read out from the 1st column (L1) and the 2nd column (L2) after the exposure of the 2nd column (L2) ends.

FIG. 10B illustrates a case where multiple capture is made at a short exposure pixel as an embodiment of the present invention. FIG. 10B may indicate, for example, a case where the 1st column (L1) is composed of short exposure pixels only and the 2nd column (L2) is composed of long exposure pixels only. When the short exposure pixel of the 1st column (L1) has an exposure time of $1/32$ sec and the long exposure pixel of the 2nd column (L2) has an exposure time of $1/4$ sec, this may result in a blank time of $7/32$ second ($1/4 - 1/32 = 7/32$) before data is read out from the two columns. This blank time may be utilized to further receive at least one image for a high-performance HDR image with reduced noise. For example, a first short exposure image 1004 may be obtained from the short exposure pixel and stored in the buffer, the short exposure pixel is reset, and then a second short exposure image 1005 may be obtained from the short exposure pixel. In this case, the second short exposure image 1005 may be an image with an exposure time of $1/8$ or $1/16$ sec shorter than $7/32$ sec. The first short exposure image 1004 of 1/32 sec, the second short exposure image 1005 of 1/8 sec, and a long exposure image 1006 of 1/4 sec may be used to produce an HDR image.

Figure 11A:
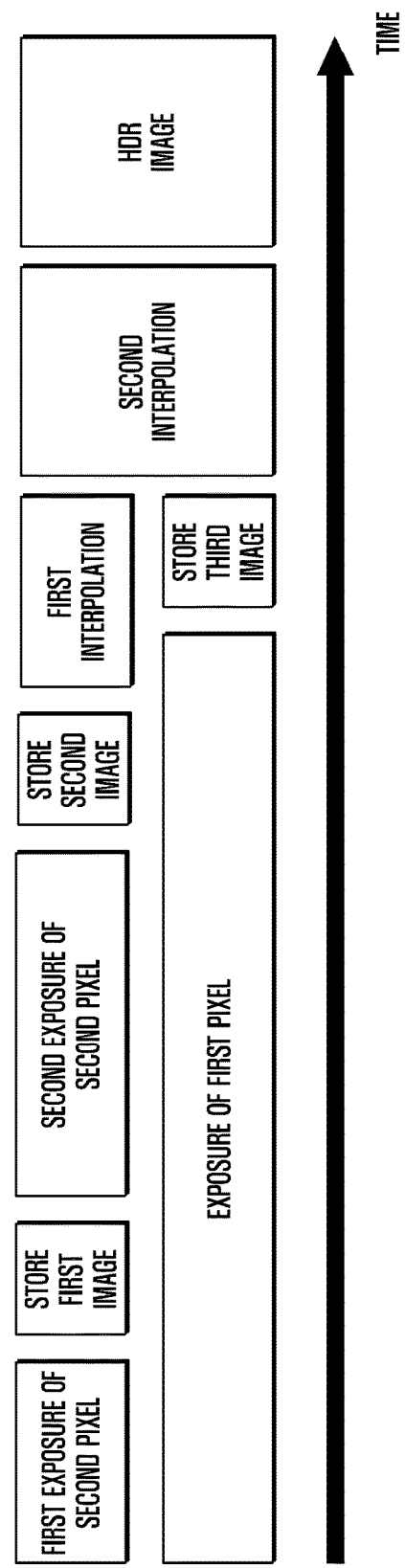
FIGS. 11A and 11B illustrate timings for pixel exposure, data readout, and image synthesis according to various embodiments of the present invention.
Figure 11B:
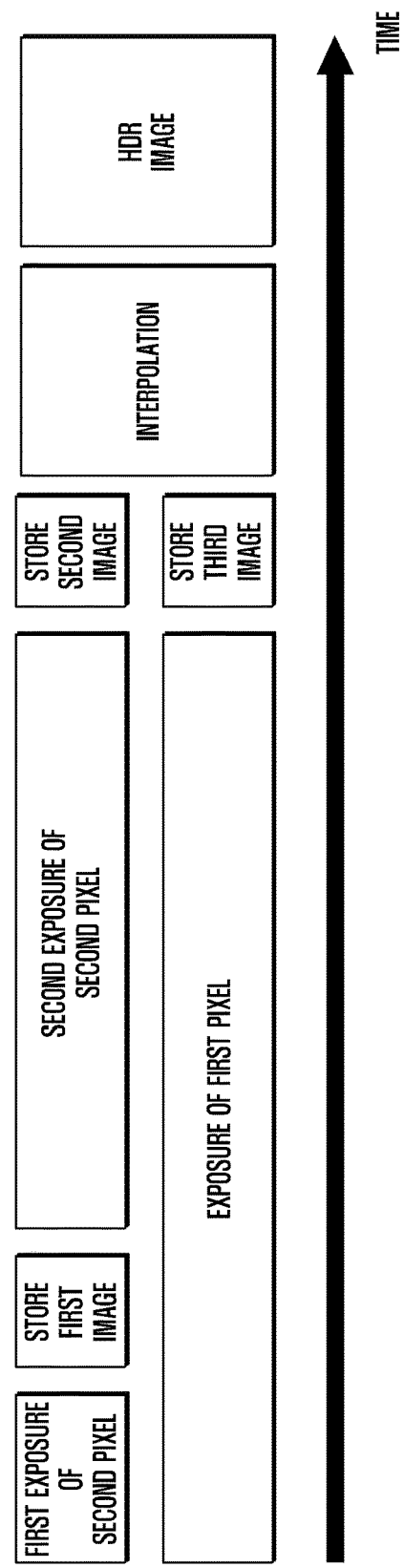

FIGS. 11A and 11B illustrate timings for pixel exposure, data readout, and image synthesis according to various embodiments of the present invention.

In FIG. 11A, first interpolation is applied to images obtained by a short exposure pixel through exposure and data readout. In the electronic device 200, a short exposure pixel (e.g. second pixel in FIG. 9A) is exposed for a first exposure time, the short exposure pixel is read out as a first image, and the first image is stored in the buffer. Thereafter, the short exposure pixel is reset, and then exposed again for a second exposure time, producing a second image. The electronic device 200 may apply first interpolation to the first image and the second image to produce a fourth image, which may be an HDR image using short exposure pixels only. When the exposure of a long exposure pixel (e.g. first pixel in FIG. 9A) ends, a long exposure pixel image is obtained as a third image. The electronic device 200 may apply second interpolation to the third image and the fourth image. The electronic device 200 may acquire a final HDR image by applying second interpolation to the third image and the fourth image.

FIG. 11B depicts a timing relationship where a first image and a second image are obtained using a short exposure pixel, a third image is obtained using a long exposure pixel, and a final HDR image is obtained by applying interpolation to the first to third images at one time.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. A method of image processing for an electronic device, the method comprising:
   acquiring a first image with a first exposure time by using a first pixel group;
   acquiring a second image with a second exposure time shorter than the first exposure time by using a second pixel group;
   determining whether a difference between the first exposure time and the second exposure time is greater than or equal to a preset threshold;
   if the difference between the first exposure time and the second exposure time is greater than or equal to the preset threshold, acquiring a third image with a third exposure time by using the second pixel group; and
   generating a high dynamic range (HDR) image by combining the first image, the second image, and the third image.

2. The method of claim 1, wherein a sum of the second exposure time and the third exposure time is less than or equal to the first exposure time.

3. The method of claim 2, wherein the generating of the HDR image comprises:
   generating a fourth image by combining the second image and the third image; and
   generating the HDR image by combining the first image and the fourth image.

4. The method of claim 3, further comprising generating the third image before or after an end of the first exposure time.

5. The method of claim 1, wherein the third exposure time is shorter than the first exposure time and longer than the second exposure time.

6. The method of claim 1, further comprising:
   determining whether an underexposure or an overexposure has occurred in the first image or the second image;
   when determining that the underexposure or the overexposure has occurred in the first image or the second image, acquiring the third image with the third exposure time shorter than the first exposure time and longer than the second exposure time by using the second pixel group; and
   generating the HDR image by combining the first image, the second image, and the third image.

7. The method of claim 1, further comprising:
   acquiring the third image by using a third pixel group including one or more third pixels besides the first pixel group or the second pixel group,
   wherein an exposure time of the third pixel group is shorter than an exposure time of the first pixel group and longer than an exposure time of the second pixel group, and
   wherein a sum of the exposure times of the second pixel group and the third pixel group is greater than or less than the exposure time of the first pixel group.

8. An electronic device comprising:
   a camera including an image sensor; and
   a processor including at least one of an image processor or an image signal processor (ISP),
   wherein the processor is configured to:
      acquire through the camera a first image with a first exposure time by using a first pixel group,
      acquire through the camera a second image with a second exposure time shorter than the first exposure time by using a second pixel group,
      determine whether a difference between the first exposure time and the second exposure time is greater than or equal to a preset threshold,
      if the difference between the first exposure time and the second exposure time is greater than or equal to the preset threshold, acquire through the camera a third image with a third exposure time by using the second pixel group, and
      generate a high dynamic range (HDR) image by combining the first image, the second image, and the third image.

9. The electronic device of claim 8, wherein a sum of the second exposure time and the third exposure time is less than or equal to the first exposure time.

10. The electronic device of claim 9, wherein the processor is further configured to:
    generate a fourth image by combining the second image and the third image, and
    generate the HDR image by combining the first image and the fourth image.

11. The electronic device of claim 10,
    wherein the processor is further configured to generate the third image before or after an end of the first exposure time.

12. The electronic device of claim 8, wherein the third exposure time is shorter than the first exposure time and longer than the second exposure time.

13. The electronic device of claim 8, wherein the processor is further configured to:
    determine whether an underexposure or overexposure has occurred in the first image or the second image, when it is determined that the underexposure or the overexposure has occurred in the first image or the second image, acquire the third image with the third exposure time shorter than the first exposure time and longer than the second exposure time by using the second pixel group, and generate the HDR image by combining the first image, the second image, and the third image.

14. The electronic device of claim 8, wherein the processor is further configured to acquire the third image by using a third pixel group including one or more third pixels besides the first pixel group or the second pixel group, wherein an exposure time of the third pixel group is shorter than an exposure time of the first pixel group and longer than an exposure time of the second pixel group, and wherein a sum of the exposure times of the second pixel group and the third pixel group is greater than or less than the exposure time of the first pixel group.

15. The electronic device of claim 8, wherein the image sensor includes the first pixel group and the second pixel group, wherein an first pixel group includes one or more first pixels and the second pixel group includes one or more second pixels, wherein an exposure time of the one or more first pixels is longer than an exposure time of the one or more second pixels, and wherein pixels of the first pixel group and pixels of the second pixel group are arranged in a regular or irregular pattern in the image sensor.

* * * * *